(12) United States Patent
Fitzsimmons et al.

(10) Patent No.: US 10,579,911 B2
(45) Date of Patent: Mar. 3, 2020

(54) SYSTEMS AND RELATED METHODS EMPLOYING DIRECTED ENERGY AND MACHINE LEARNING OPERABLE FOR ENABLING OR PROTECTING FROM NON-DESTRUCTIVE DEGRADATION OR DISRUPTION OF ELECTRO-OPTIC(S) OR SENSORS

(71) Applicant: The United States of America, as represented by the Secretary of the Navy, Crane, IN (US)

(72) Inventors: Tyler Fitzsimmons, Bloomington, IN (US); Betsy Marschand, Bloomington, IN (US); Clay Armstrong, Jasper, IN (US); Joshua Borneman, Bloomington, IN (US); Aaron Cole, Bloomington, IN (US); Lauren Christopher, Indianapolis, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 61 days.

(21) Appl. No.: 15/916,475

(22) Filed: Mar. 9, 2018

(65) Prior Publication Data
US 2018/0341837 A1 Nov. 29, 2018

Related U.S. Application Data

(60) Provisional application No. 62/510,034, filed on May 23, 2017.

(51) Int. Cl.
  *G06K 9/66* (2006.01)
  *H04N 7/18* (2006.01)
  (Continued)

(52) U.S. Cl.
  CPC .......... *G06K 9/66* (2013.01); *G06K 9/00718* (2013.01); *G06K 9/6253* (2013.01); *H04N 7/181* (2013.01); *G01J 1/4257* (2013.01)

(58) Field of Classification Search
  CPC .... G06K 9/66; G06K 9/00718; G06K 9/6253; H04N 7/183; H04N 7/181; G01J 1/4257
  (Continued)

(56) References Cited

U.S. PATENT DOCUMENTS 5,998,386 A * 12/1999 Feldman ................ A61K 31/00
                                                   514/45
7,272,586 B2 * 9/2007 Nauck ................ G05B 13/0275
                                                    706/52

(Continued)

*Primary Examiner* — Sheela C Chawan
(74) *Attorney, Agent, or Firm* — Naval Surface Warfare Center, Crane Division

(57) ABSTRACT

Various embodiments can include artificial learning counter surveillance (ALCS) or self-protection surveillance systems (SPSS) and related methods. Apparatuses and methods can include non-destructive electro-optic interference or protection systems as well non-destructive directed energy systems, a control system, and an analysis system for determining an optical system of interest and generating degradation or disruption effects using various equipment items and machine learning systems. Additionally, methods are also provided for determining degree of severity of degradation or disruption based on threshold definitions related to ability to use the optical system of interest for one or more specified applications.

21 Claims, 22 Drawing Sheets

(51) Int. Cl.
*G06K 9/00* (2006.01)
*G06K 9/62* (2006.01)
*G01J 1/42* (2006.01)

(58) Field of Classification Search
USPC .............. 382/156, 224, 232, 312, 321;
348/E5.001, E5.062, E5.064; 345/156,
345/180; 377/10
See application file for complete search history.

(56) References Cited

U.S. PATENT DOCUMENTS

| | | | | |
|---|---|---|---|---|
| 7,286,998 | B2 * | 10/2007 | Sauser | G06Q 10/02 |
| | | | | 705/7.37 |
| 8,568,538 | B2 * | 10/2013 | Kerber | B82Y 30/00 |
| | | | | 148/276 |
| 2002/0138492 | A1 * | 9/2002 | Kil | G06K 9/6253 |

* cited by examiner

765
Select a number X (e.g., five) time stamp adjacent segregated, e.g., five before LO video frames immediately before "during LO" time stamp video frames, and averaging adjacent frame pixels within this selected group together and generate an averaged selected before LO video frame file. In this example, perform this adjacent frame averaging for each selected before LO video to get single before LO averaged frame and save averaged before LO video file (e.g. see PFAS 95)

768
User inputs (e.g., selecting a before or during LO video stabilization from video parsing step 89) and video parameters (e.g., select frame region stabilization function searches (e.g., x and y coordinates of search region, width and height in pixel values e.g., 40 by 40 pixels)) within non-avg'd before LO and after LO video files) ( e.g. see PFAS 97)

771
Initiate video stabilization (e.g., by use of MATLAB® video stability operator specifying/input of X & Y coordinates for frame search region in GUI or machine instructions/config file and begins stepping through step 97 selected segregated video (e.g. see PFAS 100)

774
Perform stabilization by reducing frame-to-frame movement through X & Y measurement in video frames. Save new stabilized video. (e.g. see PFAS 103)

FIG. 7B

811 — Execute SSIM Data Generating Function: passing neighboring frames through a low pass filter, and analyze similarities between frames (e.g. see VM 156)(e.g., measuring luminance contrast between frames to output a measure of similarity e.g., between zero and one where zero is complete dissimilarity and 1 is complete similarity which is used as a video metric used in degradation or disruption evaluation)

814 — User Selection of a Pixel in Area Where Laser is Expected or Actually Impinges on Video Frames to Generate a Laser Energy Frame Impingement Location Using GUI Pointing Device and Execution of Saturated Pixels Function: Calculates saturation level of selected pixel and uses calculated saturation level of the selected pixel to select all pixels within minus 10 percent and above of selected pixel saturation value, designate the selected pixel as "saturated", then count total number of saturated pixels in each selected frame (e.g. see VM 159) which is used as a video metric used in degradation or disruption evaluation)

817 — Execute Radius of Saturated Pixels Function: Calculates centroid of saturated pixels closest to laser energy frame impingement location (selected by user in step 814) and calculates contiguous radius of saturated pixels around this location (e.g. Fig. 12, 524; see VM 161) which is used as a video metric used in degradation or disruption evaluation)

820 — Execute Power Spectral Density Function: Calculates a Fast Fourier Transform (spatial to frequency domain) of a video frame of interest (e.g. see VM 165) which is used as a video metric used in degradation or disruption evaluation (e.g., frames of interest are "during" LO frames)

79 — (Subroutine C) Preparing Video Metrics Analysis Data for Input Into Artificial Neural Network

830 — Input video metrics data output for each selected laser operation (LO) event (see Figure 14) (e.g., SSIM, radius and number of saturated pixels, PSD, pixel value histogram) from Subroutine B 78, rearrange format into a organized data structure (e.g., an array or a database with columns for each video metric) and eliminating headers to generate an Artificial Neural Network (ANN) input file for each LO event (see Figure 15) (e.g. see code appendix Metrics Analysis Data Input Into Artificial Neural Network (MADI) 190)

833 — Input and combine two or more of the ANN input files that are each associated with a single LO event where each selected LO event's input ANN is stored in individual rows in a database retaining column formatting from the ANN input file (e.g., Excel® file) to generate a LO event video metrics file (e.g. see code appendix MADI 192) (see Figure 16)

836 — Redefine user classification of degradation or disruption levels (e.g., no effect or "0", degradation or "1", or disruption or "2") for each selected before or during video output associated with an LO event (e.g., shots) in Excel format to enable execution of supervised learning scenario to train the ANN (e.g. see code appendix MADI 194) to generate a file for selected LO events and associated degradation/disruption classification levels and establish partition parameters for statistical comparison. In at least some embodiments, degradation and disruption classification is determined based on DoD Joint Publication 13.1, Electronic Warfare descriptions of degradation and disruption which is focused on degrees of ability to perform a particular task or mission. (see Figure 17)

839 — Statistcally compare step 833 data and user classifications by adding/removing video metric variables (e.g., SSIM, radius and number of saturated pixels, PSD, pixel value histogram) to model, performing regression, and calculate error to determine most impactful variables (e.g. sequential feature selection) (e.g. see code appendix MADI 196) to generate or impact or change coefficient number associated with each video metric variable to characterize effect of each variable on model results

FIG. 11A

OVERALL FUNCTION LIST

77 (Subroutine A) Video Parsing/Frame Averaging/Video Stabilization (implemented by code appendix module 77)

305—sprintf & vision.VideoFileReader (implemented by code appendix module 83)
    308—fileparts & fopen (implemented by code appendix module 86)
    311—step
        _writeVideo (implemented by code appendix module 89)
    314—fileparts (implemented by code appendix module 92)
    317—step
    320—~isDone
        —VideoWriter
        —step
        —imwrite (implemented by code appendix module 95)
    323—vision.VideoFilesReader & vision.VideoFilesWriter & vision.GeometricTranslator (implemented by code module 97)
    326—fileInfo.VideoSize & ~isDone
        —step (implemented by code appendix module 100)
    329—Stabilized & vision.VideoFileWriter (implemented by code appendix module 103)

78 (Subroutine B) Video Metric Analysis with GUI (implemented by code appendix module 78)

332—uigetfile & insertButtons & figure & uicontrol & playCallback (implemented by code appendix module 130)
    335—vision.VideoFileWriter & step (implemented by code appendix module 133)
    338—ssimsource (implemented by code appendix module 136)
    341—getSatPixelsGUI (implemented by code appendix module 139)
    344—twobarhist (implemented by code appendix module 141)
    347—getPowSpecDenGUI (implemented by code appendix module 144)
    350—vision.VideoFileWriter & step
        —ssimsource
        —getSatPixelsGUI
        —twobarhist
        —getPowSpecDenGUI (implemented by code appendix module 147)
    353—ssimsource (implemented by code appendix module 156)
    356—getSatPixelsGUI (implemented by code appendix module 159)
    359—satData.minRad (implemented by code appendix module 161)
    362—getPowSpecDenGUI (implemented by code appendix module 165)

FIG. 11B 79 (Subroutine C) Optimization/Selection of Video Metrics (Measures of Effectiveness) For use in Analysis and Data Input Into Artificial Neural Network 365—xlsread (implemented by code appendix module 190) (see also Step 830, Fig. 9)
    368—xslread (implemented by code appendix module 192) (see also Step 833, Fig. 9)
    371—cvpartition (implemented by code appendix module 194) (see also Step 836, Fig. 9)
    374—statset & sequentialfs (implemented by code appendix module 196) (see also Step 839, Fig. 9)

80 (Subroutine D) An ANN DEE Type Classifier System that Classifies Images Sequences from EOSOI Outputs Based on Selected MOEs (Selected Video Metrics) (See Fig. 10 for Subroutine D process)

377—File read instructions (implemented by code appendix module 230; Fig. 10, Step 860)
    380—patternet (implemented by code appendix module 233; Fig. 10, Step 863)
    383—net.layers.transfer.FCN (defines ANN transfer function for each layer (two layers in this embodiment))(implemented by code appendix module 236; Fig. 10, Step 866)
    389—net.dividFcn, net.dividMode, net.diviceParam.trainratio, netdividParam.valRatio, and net.diviceParam.testRatio (ANN division of data function) (implemented by code appendix module 241; Fig. 10, Step 872)
    392—net.trainFcn & net.trainParam.** (function and data structure that defines ANN optimization parameters training function and parameters by providing neural network training goals used to train a neural network based on inputs and goals and termination of training processing when goal(s) are met) (implemented by code appendix module 244; Fig. 10, Step 875)
    395—net.performFcn (selects a performance function for the ANN algorithm to optimize (e.g. mean squared error, mean absolute error, etc.) (implemented by code appendix module 251; Fig. 10, Step 881)
    398—train, test/calculate performance, validate and recalculate ANN data processing subroutines group (includes train, save net, net, perform, etc)(implemented by code appendix module 251; Fig. 10, Step 881)
    401—plorttrainstate, plotroc, and plotconfusion subroutines group (implemented by code appendix module 255; Fig. 10, Step 884)

| Metric Name | Value | Metric Name | Value | Metric Name | Value |
|---|---|---|---|---|---|
| Metrics: SSIMDurmax= | 0.21474 | SSIMDurmean | 0.081736 | MeanSatPix= | 2427.443 |
| Metrics: SSIMDurmaxTarget= | 0.19096 | SSIMDurmeanTarget | 0.042622 | MeanSatPixTargaet= | 1726.46 |
| Metrics: SSIMBefmax= | 0.49835 | SSIMBefmean | 0.49113 | MeanBefPix= | 665.9355 |
| Metrics: SSIMBefmaxTarget= | 0.50746 | SSIMBefmeanTarget | 0.47697 | MeanBefPixTarget= | 22.0323 |

| Metric Name | Value | Metric Name | Value | Metric Name | Value |
|---|---|---|---|---|---|
| RadiusDurMean= | 31.7817 | HistDurDif30= | 1241.5 | PSDDurRadDif30= | 0.030398 |
| RadiusDurMeanTarget= | 31.9148 | HistDurDif30Target= | 386.9609 | PSDDurRadDif30Target= | 0.033769 |
| RadiusBefMean= | 0 | HistBeDif15= | 910.6016 | PSDBefRadDif15= | 0.034294 |
| RadiusBefMeanTarget= | 0 | HistBeDif15=Target | 140.4844 | PSDBefRadDif15Target= | 0.005822 |

FIG.14

| 0.49835 | 0.50746 | 0.49113 | 0.47697 | 0.005822 | 910.6016 | 140.4844 | 0 | 0 |
|---|---|---|---|---|---|---|---|---|
| 0.21474 | 0.19096 | 0.081736 | 0.042622 | 0.034294 | 0.033769 | 0.030398 | 31.7817 | 31.9148 |

| 665.9355 | 22.0323 | 1241.5 | 386.9609 |
|---|---|---|---|
| 2427.443 | 1726.46 | | |

FIG.15

|    | A       | B       | C       | D       | E        | F        | G        | H        | I        | J        | K        | L        |
|----|---------|---------|---------|---------|----------|----------|----------|----------|----------|----------|----------|----------|
| 1  | 0.76752 | 0.60056 | 0.74497 | 0.57673 | 13.2757  | 13.2757  | 28796.19 | 8916.065 | 0.000644 | 0.0023   | 170.5938 | 94.1172  |
| 2  | 0.72525 | 0.55598 | 0.71631 | 0.54503 | 57.7149  | 34.3187  | 37113.14 | 10844.34 | 0.004409 | 0.040495 | 498.6719 | 231.4141 |
| 3  | 0.53578 | 0.60862 | 0.53354 | 0.6039  | 0        | 0        | 18490.37 | 8940.333 | 0.040335 | 0.00149  | 868.2344 | 73.6875  |
| 4  | 0.50706 | 0.56741 | 0.49894 | 0.55301 | 0        | 15.7895  | 18721.69 | 9573.513 | 0.042542 | 0.03076  | 932.0938 | 203.8359 |
| 5  | 0.54023 | 0.62094 | 0.52583 | 0.59791 | 0        | 0        | 18993.4  | 9191.533 | 0.040519 | 0.000863 | 866.1016 | 77.3125  |
| 6  | 0.50692 | 0.56895 | 0.49733 | 0.55209 | 9.017    | 51.0677  | 21668.22 | 11672.02 | 0.043007 | 0.038598 | 931.3516 | 203.375  |
| 7  | 0.53045 | 0.59452 | 0.52327 | 0.5857  | 0        | 0        | 18992.53 | 9471.067 | 0.040515 | 0.000749 | 868.5938 | 80.6484  |
| 8  | 0.51207 | 0.5706  | 0.50586 | 0.55958 | 6.6344   | 28.985   | 20952.25 | 10758.98 | 0.042659 | 0.03922  | 937.1094 | 229.5859 |
| 9  | 0.76885 | 0.61102 | 0.75704 | 0.60073 | 9.3323   | 9.3323   | 26436.87 | 8691.161 | 0.000572 | 0.001995 | 128.2656 | 77.8359  |
| 10 | 0.33932 | 0.18506 | 0.2748  | 0.10825 | 120.5716 | 107.4877 | 9264.954 | 7175.45  | 0.043941 | 0.25205  | 798.2344 | 380.9219 |
| 11 | 0.53141 | 0.59303 | 0.52193 | 0.58005 | 11.3208  | 11.3208  | 17359    | 8530.967 | 0.040347 | 0.001232 | 867.0234 | 84.5547  |
| 12 | 039748  | 0.39577 | 0.37758 | 0.36362 | 101.3281 | 88.689   | 4626.48  | 2874.933 | 0.057673 | 0.076399 | 1109.664 | 354.8672 |
| 13 | 0.52844 | 0.59857 | 0.51676 | 0.57837 | 15.5234  | 15.5234  | 17357.03 | 8687     | 0.040582 | 0.002582 | 871.7813 | 96.9453  |
| 14 | 0.4859  | 0.53044 | 0.47467 | 0.51045 | 50.6441  | 154.9931 | 12819.96 | 5633.987 | 0.045858 | 0.053966 | 989.0156 | 280.1797 |
| 15 | 0.52956 | 0.59439 | 0.52265 | 0.58164 | 0        | 0        | 18216.07 | 8864.833 | 0.040834 | 0.001204 | 858.9453 | 70.9531  |
| 16 | 0.32889 | 0.28294 | 0.29951 | 0.24518 | 100.7625 | 94.6881  | 5313.14  | 4063.873 | 0.060927 | 0.14331  | 1221.797 | 406.0859 |
| 17 | 0.53384 | 0.59447 | 0.53085 | 0.58524 | 1.362    | 1.362    | 18238.73 | 8817.967 | 0.040515 | 0.001569 | 869.8203 | 74.8047  |
| 18 | 0.26414 | 0.20749 | 0.23035 | 0.16514 | 112.1194 | 100.6195 | 7463.24  | 5610.593 | 0.065302 | 0.15932  | 1193.867 | 407.6953 |
| 19 | 0.69697 | 0.52247 | 0.69262 | 0.51772 | 9.3323   | 9.3323   | 26436.87 | 8691.161 | 0.001063 | 0.002319 | 210.3672 | 104.3906 |
| 20 | 0.30096 | 0.13966 | 0.23529 | 0.081024 | 116.4458 | 108.2491 | 10365.89 | 7677.57  | 0.049652 | 0.2817   | 1045.305 | 431.8438 |
| 21 | 0.52809 | 0.60744 | 0.52164 | 0.59418 | 0        | 0        | 17595.2  | 8730.9   | 0.040706 | 0.001298 | 865.7266 | 73.9141  |

FIG.16A

| 22 | 0.1973 | 0.14255 | 0.13089 | 0.080586 | 116.8231 | 111.155 | 10831.39 | 8166.22 | 0.070996 | 0.23444 | 1154.766 | 401.7734 |
| 23 | 0.52847 | 0.59489 | 0.52064 | 0.58074 | 0 | 0 | 17548.9 | 8830.567 | 0.040707 | 0.000682 | 869.2656 | 79.6875 |
| 24 | 0.17384 | 0.12825 | 0.10586 | 0.061606 | 117.3903 | 114.6589 | 13186.47 | 9223.3 | 0.077798 | 0.24629 | 1322.313 | 413 |
| 25 | 0.5234 | 0.59137 | 0.51868 | 0.58483 | 0 | 0 | 16730.17 | 8313.667 | 0.040475 | 0.001678 | 864.2578 | 59.4063 |
| 26 | 0.17893 | 0.13815 | 1.11927 | 0.07208 | 115.7103 | 113.5012 | 11452.08 | 8127.7 | 0.073778 | 0.20523 | 1237.516 | 366.6719 |
| 27 | 0.52815 | 0.59996 | 0.52401 | 0.59068 | 0 | 0 | 17349.23 | 8636.867 | 0.040099 | 0.001832 | 862.8984 | 72.4063 |
| 28 | 0.13273 | 0.085758 | 0.093589 | 0.053758 | 137.4083 | 130.6292 | 16142.66 | 10528.38 | 0.075151 | 0.24909 | 1282.781 | 417.6484 |
| 29 | 0.76204 | 0.60343 | 0.73572 | 0.58474 | 0 | 0 | 26643.9 | 8765.233 | 0.000724 | 0.00178 | 132.2031 | 76.3516 |
| 30 | 0.17588 | 0.072317 | 0.12345 | 0.041923 | 132.7233 | 125.7988 | 19783.03 | 10815.09 | 0.052448 | 0.23609 | 938.1328 | 399.4609 |
| 31 | 0.52826 | 0.60032 | 0.51717 | 0.58157 | 4.8134 | 4.8134 | 17787.9 | 8834.767 | 0.04068 | 0.001698 | 872.4063 | 80.9297 |
| 32 | 0.11101 | 0.078612 | 0.071563 | 0.038878 | 153.5016 | 138.1128 | 18328.56 | 11858.63 | 0.077548 | 0.30363 | 1386.156 | 456.9844 |
| 33 | 0.53299 | 0.60956 | 0.5243 | 0.59362 | 0 | 5.3166 | 17101 | 8558.167 | 0.040705 | 0.001155 | 877.5938 | 87.4922 |

FIG.16B

| | A | B | C | D | E | F | G |
|---|---|---|---|---|---|---|---|
| 1 | Shot Number | Test | During/Before | D0/D1/D2 | | | |
| 2 | 1 | PSDS | Before | 0 | 0 | 1 | 2 |
| 3 | 1 | PSDS | During | 2 | 1 | 0 | 0 |
| 4 | 2 | PSDS | Before | 0 | 0 | 0 | 1 |
| 5 | 2 | PSDS | During | 1 | 1 | 0 | 0 |
| 6 | 3 | PSDS | Before | 0 | 0 | 1 | 0 |
| 7 | 3 | PSDS | During | 1 | 1 | 0 | 0 |
| 8 | 4 | PSDS | Before | 0 | 0 | 1 | 0 |
| 9 | 4 | PSDS | During | 2 | 1 | 0 | 0 |
| 10 | 5 | PSDS | Before | 0 | 0 | 0 | 1 |
| 11 | 5 | PSDS | During | 2 | 1 | 0 | 0 |
| 12 | 6 | PSDS | Before | 0 | 0 | 0 | 1 |
| 13 | 6 | PSDS | During | 2 | 1 | 0 | 0 |
| 14 | 7 | PSDS | Before | 0 | 0 | 0 | 1 |
| 15 | 7 | PSDS | During | 2 | 1 | 0 | 0 |
| 16 | 8 | PSDS | Before | 0 | 0 | 0 | 0 |
| 17 | 8 | PSDS | During | 1 | 1 | 1 | 0 |
| 18 | 9 | PSDS | Before | 0 | 0 | 1 | 0 |
| 19 | 9 | PSDS | During | 1 | 1 | 1 | 0 |
| 20 | 10 | PSDS | Before | 0 | 1 | 0 | 0 |

FIG.17

SYSTEMS AND RELATED METHODS EMPLOYING DIRECTED ENERGY AND MACHINE LEARNING OPERABLE FOR ENABLING OR PROTECTING FROM NON-DESTRUCTIVE DEGRADATION OR DISRUPTION OF ELECTRO-OPTIC(S) OR SENSORS

CROSS-REFERENCE TO RELATED APPLICATION

This application claims priority to U.S. Provisional Patent Application Ser. No. 62/510,034, filed on May 23, 2017, entitled "ARTIFICIAL LEARNING COUNTER SURVEILLANCE SYSTEM (ALCSS) OR SELF PROTECTION SURVEILLANCE SYSTEM (SPSS) AND METHODS INCLUDING NON-DESTRUCTIVE ELECTRO-OPTIC INTERFERENCE OR PROTECTION SYSTEM AND RELATED METHODS INCLUDING NON-DESTRUCTIVE DIRECTED ENERGY SYSTEM, A CONTROL SYSTEM, AND ANALYSIS SYSTEM AND RELATED METHODS FOR DETERMINING OPTICAL SYSTEM OF INTEREST DEGRADATION OR DISRUPTION USING MACHINE LEARNING SYSTEMS AND METHODS FOR DETERMINING DEGREE OF SEVERITY OF DEGRADATION OR DISRUPTION," the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,438) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

The present invention generally relates to a testing, classification, analysis system (TCAS) including an artificial learning counter surveillance system (ALCSS) used in relation to various optical systems to determine degradation or disruption or a self-protection surveillance system (SPSS) for protecting electro-optic assets.

A need was identified for a capability to provide protection against and ability to create degradation and disruption against electro-optic systems of interest using non-destructive directed energy systems capable of avoiding permanent destruction of a system of interest. For example, laser countermeasures frequently cause permanent damage to a system they are directing energy against such as a surveillance or UAV system with a camera or optics system.

Embodiments of the invention can enable use of a directed energy system, e.g., laser energy, to either ensure or prevent a platform or entity with one or more electro-optic systems to perform its designated or predetermined mission without damage to the platform and the electro-optic system. Embodiments of the invention are capable of either causing or protecting against a range of degradations or disruptions including minor degradation of the entity or platform's electro-optic system to complete disruption. Embodiments include methods and systems that are adapted to measure effectiveness of a directed energy system in disrupting or degrading an electro-optics system of interest.

Existing systems were inadequate as they did not have necessary information or control systems and control logic. They were highly dependent on subjective human analysis which was time consuming, not real time, and highly unreliable. Existing systems included laser countermeasures analysis systems that used very different analysis approaches. For example, analysis relied solely or largely on the human vision system (HVS), which is subjective. Additionally, existing countermeasures systems have a capability limited to a binary relationship with an adversary's targets, either not engaged or engaged to destroy. The exemplary HVS was used to determine effectiveness of an engagement (destroyed/not destroyed).

An advantage of the embodiments or an example of the invention includes a capability to create a system or countermeasures that are not limited to such a binary relationship. Additionally, embodiments of the invention can enable analysis of effectiveness of a counter measure with respect to an electro-optic system of interest employing systematic, machine learning algorithms that allow users to select specific video metrics to be used in classifying severity of degradation or disruption associated with the optical system of interest. Now a system can enable operations supporting (generating or protecting against) varying levels of disruption or degradation engagement types (e.g., minor degradation to complete disruption) on the adversary's electro-optic systems and have accompanying quantifiable results for analysis.

Embodiments of the invention can include analysis systems that automate video analysis for directed energy and electro-optic countermeasure uses by determining the effectiveness of each laser shot. An exemplary machine learning algorithm establishes a systematic approach to analyzing data that originally seemed to diverge from an obvious pattern for given video metrics. Furthermore, video processing approaches without machine learning requires constant human interaction, which drastically increases the time commitment to parse through data. Exemplary implementation of machine learning algorithms in embodiments of the invention not only allows for a systematic analysis but significantly increases efficiency. Embodiments of the invention also enable quantification of effectiveness of directed energy to disrupt or degrade an electro-optic system of interest whereas the HVS was only able to qualify such effectiveness. This new capability enables an entirely new way to report or determine effectiveness in the surveillance protection or privacy contexts.

Additionally, an embodiment includes video metrics (structural similarity metrics, power spectral density, and radius of saturated pixels) that were selected by using a video or image feature selection program, e.g., within MATLAB®, then further validated through hands-on testing. The feature selection program in MATLAB used advanced statistics to compare the structural similarity metric, power spectral density, radius of saturated pixels number of saturated pixels, and pixel histogram to verify which metrics were most useful. To double-check the selection of the metrics after the feature selection program, the metrics were validated through hands on testing which included running dozens of datasets through multiple combinations of the metrics.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIGS. 7A and 7B show exemplary machine readable instructions associated with Subroutine A from FIG. 6 in accordance with one embodiment of the invention to perform processing including video parsing, frame averaging, and video stabilization;

FIG. 8B shows a continuation of the machine readable instructions from FIG. 8A;

FIG. 9 shows exemplary machine readable instructions associated with subroutine C from FIG. 6 showing an exemplary approaches for preparing video metrics analysis data for input into an artificial neural network (ANN);

FIG. 11A shows an overall functions list associated with exemplary machine readable functions associated with FIG. 6 Subroutines A and B as well as with FIGS. 7A-8B;

FIG. 11B shows an overall functions list associated with exemplary machine readable functions associated with FIG. 6 Subroutines C and D as well as with FIGS. 9-10B;

FIG. 14 shows exemplary video metric output table associated with at least one embodiment of the invention;

FIG. 15 shows another exemplary video metric output table that has been reorganized for input into the ANN;

FIGS. 16A and 16B show an exemplary master video metrics file table with video related measurement associated with laser operation (LO) events concatenated into a single file that is input or used by the ANN; and FIG. 17 shows an exemplary LO event classification file for showing LO event classifications (no laser, degradation, and disruption) and type of laser used for different LO event video sets.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1A:
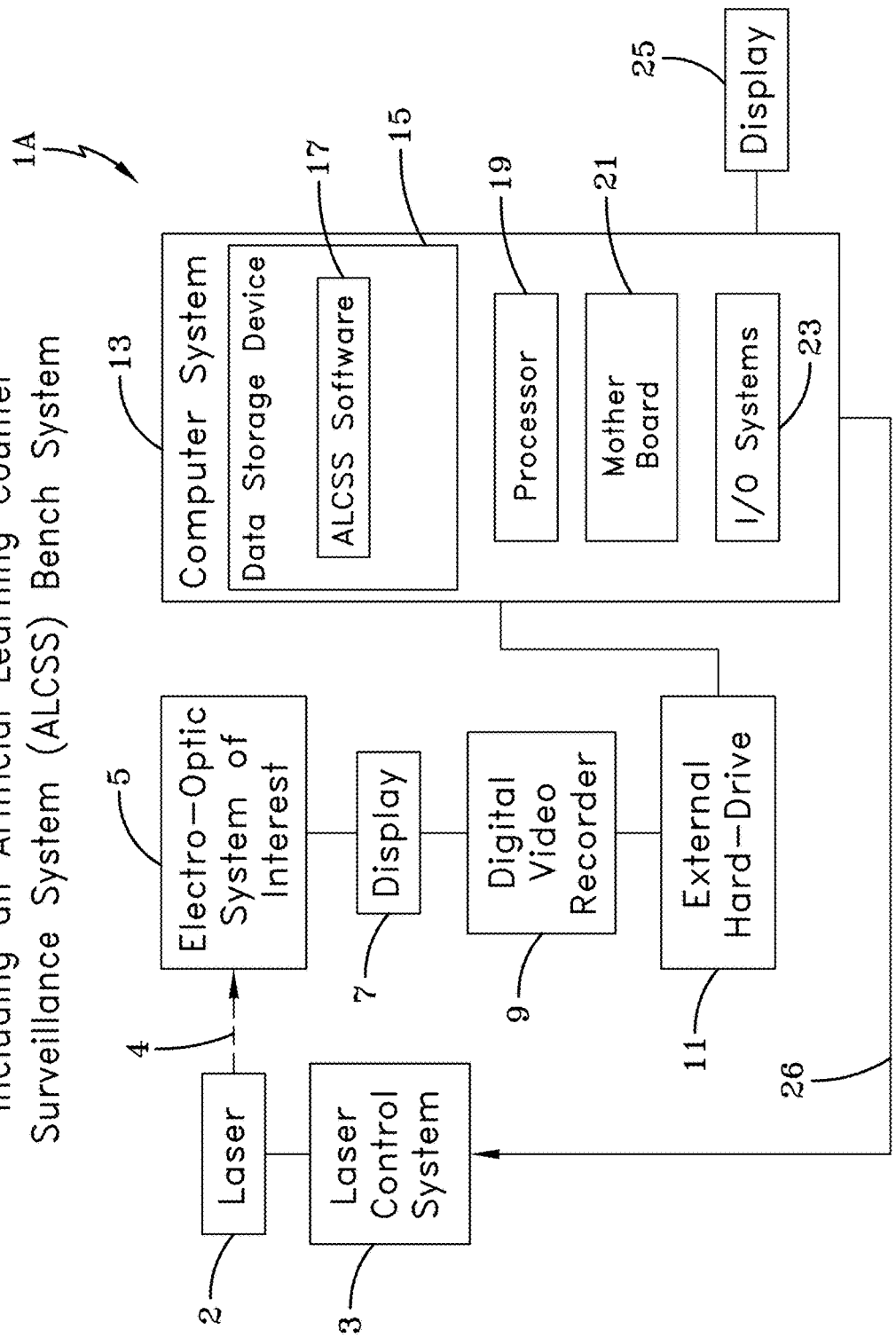
FIG. 1A shows a simplified hardware architecture for an Artificial Learning Counter Surveillance System (ALCSS) bench system and related methods that includes an artificial intelligence based electro-optic TCAS in accordance with one exemplary embodiment of the invention.

According to an illustrative embodiment of the present disclosure show in FIG. 1A, an embodiment can include an electro-optic TCAS system including an ALCSS system. The TCAS system 1A includes a laser system 2, laser control system 3, and TCAS equipment with ALCSS software provided for performing degradation and disruption testing and classification of an electro-optic system of interest (EOSOI) 5. An exemplary TCAS architecture 1A can include a digital video recorder (DVR) 9 that can be coupled with an exemplary EOSOI 5 to receive video outputs, machine instruction recording medium (e.g. hard drive), a computer with processor adapted to execute machine instructions, TCAS software including ALCSS software 17 which can be stored on the machine instruction recording medium (e.g., hard drive) 15. ALCSS software 17 analyzes output from the EOSOI 5 and input/output system 23 coupled with an external hard-drive 11 that is coupled with a DVR 9 (or optionally directly with the EOSOI 5) (e.g., a serial port or BNC cable).

Generally, an exemplary ALCSS software can be defined based on a plurality of functional modules. One example system can include a first module including video parser/frame averaging/video stabilizer section, a second module including video metrics analysis and graphical user interface (GUI) section, a third module including a data manipulation section that takes the exemplary metrics analysis module output and inputs exemplary output into an artificial intelligence neural network, and a fourth module including a measures of effectiveness (MOE) and artificial neural network (ANN) section. Exemplary ALCSS software 17 includes measures of effectiveness (MOE) software that is used by the ALCSS software 17 to classify what EO system the laser 2 is engaging. ALCSS software then is used to perform various tasks of video input using the first module to produce a plurality of video file segments created for each testing period the laser 2 is active and emitting into the EOSOI 5. The first module also outputs at least one reference frame that is associated with each of the video file segments which contains video data from the EOSOI 5 before the laser 2 is active and emitting for each testing period the laser 2 is active and emitting. Each testing period can vary in length. The laser 2 can operate at different intensities or operating characteristics as well. Computer system 13 output is shown on a display 25. Video output from the EOSOI 5 is provided to the display 7. Another video output is provided or generated from the display 7 to a DVR 9. DVR output is provided from the DVR 9 and stored on an external hard drive 11. The ALCSS software 17 accesses the DVR output stored on the external hard drive 11. The ALCSS software 17 operates a laser control system 3, which in turn operates a laser 2. Laser 2 output 4 is directed into an aperture of EOSOI 5. The ALCSS software 17 informs the laser control system 3 what irradiance is needed to degrade or disrupt the EOSOI 5.

Figure 1B:
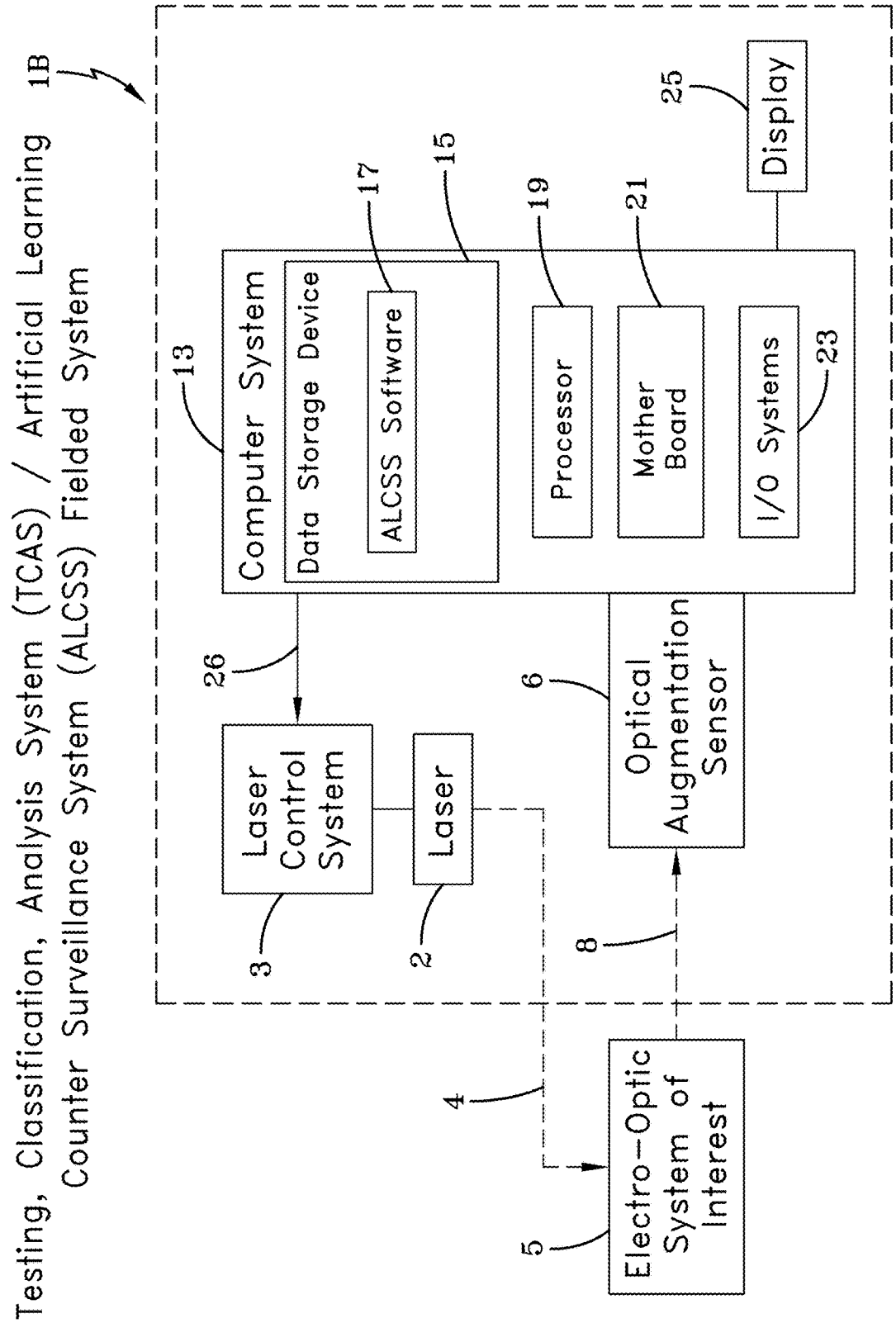
FIG. 1B shows a simplified hardware architecture for an ALCSS fielded system and related methods that includes an artificial intelligence based electro-optic TCAS in accordance with one exemplary embodiment of the invention.

FIG. 1B shows a simplified hardware architecture for an exemplary ALCSS fielded system and related methods that include an artificial intelligence based electro-optic TCAS in accordance with one exemplary embodiment of the invention. A computer system 13 is provided that includes a data storage device 15, processor 19, motherboard 21, and input/output systems 23. An exemplary embodiment of the ALCSS software 17 is stored on the data storage device 15. The exemplary computer system 13 output is shown on display 25. The ALCSS software 17 operates a laser control system 3, which in turn operates a laser 2. Laser 2 output 4 is directed into an aperture of an EOSOI 5. The optical return 8 off of the EOSOI 5 then acts on an optical augmentation sensor 6, which sends the information to the computer system 13. The exemplary embodiment of the ALCSS software 17 includes MOE software that is used by the ALCSS software to classify what EOSOI 5 system the laser 2 is engaging. The ALCSS software 17 then directs the laser control system 3 to determine what irradiance is needed to degrade or disrupt the EOSOI 5.

Figure 2:
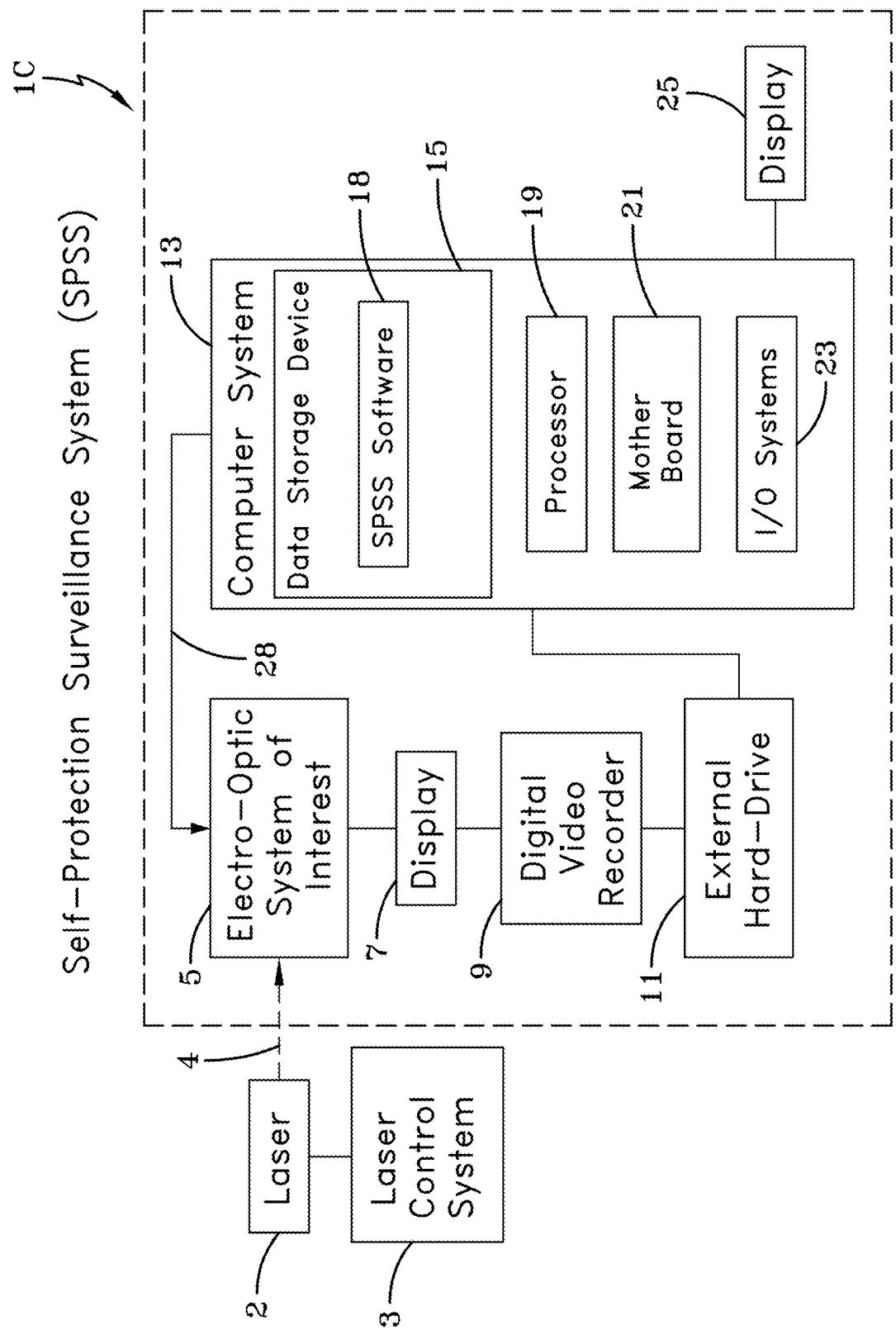
FIG. 2 shows a simplified hardware architecture for a Self-Protection Surveillance System (SPSS) that includes an artificial intelligence based electro-optic TCAS in accordance with one exemplary embodiment of the invention.

FIG. 2 shows a simplified hardware architecture for a SPSS that includes an artificial intelligence based electro-optic TCAS in accordance with one exemplary embodiment of the invention. A computer system 13 is provided that includes a data storage device 15, processor 19, motherboard 21, and input/output (I/O) systems 23. An exemplary embodiment of the SPSS software 17 is stored on the data storage device 15. Computer system 13 output is shown on a display 25. A laser control system 3 operates a laser 2 which has its output 4 directed into an aperture of the electro-optic system of interest (EOSOI) 5. Video output from the EOSOI 5 is provided to adisplay 7. Another video output is provided or generated from the display 7 to a digital video recorder (DVR) 9. DVR output is provided from the DVR 9 and stored on an external hard drive 11. The SPSS software 17 accesses the DVR output stored on the external hard drive 11. The exemplary SPSS software 17 includes MOE software that is used by the SPSS software 17 to classify what laser is engaging the EOSOI 5. The SPSS software 17 identifies characteristics of a laser 2 and controls the EOSOI 5 to deploy or operate counter-countermeasures (CCM) (e.g. filters, iris, or sensor change) through a signal bus 28 that couples a computer system 15 with the EOSOI 5.

Figure 3:
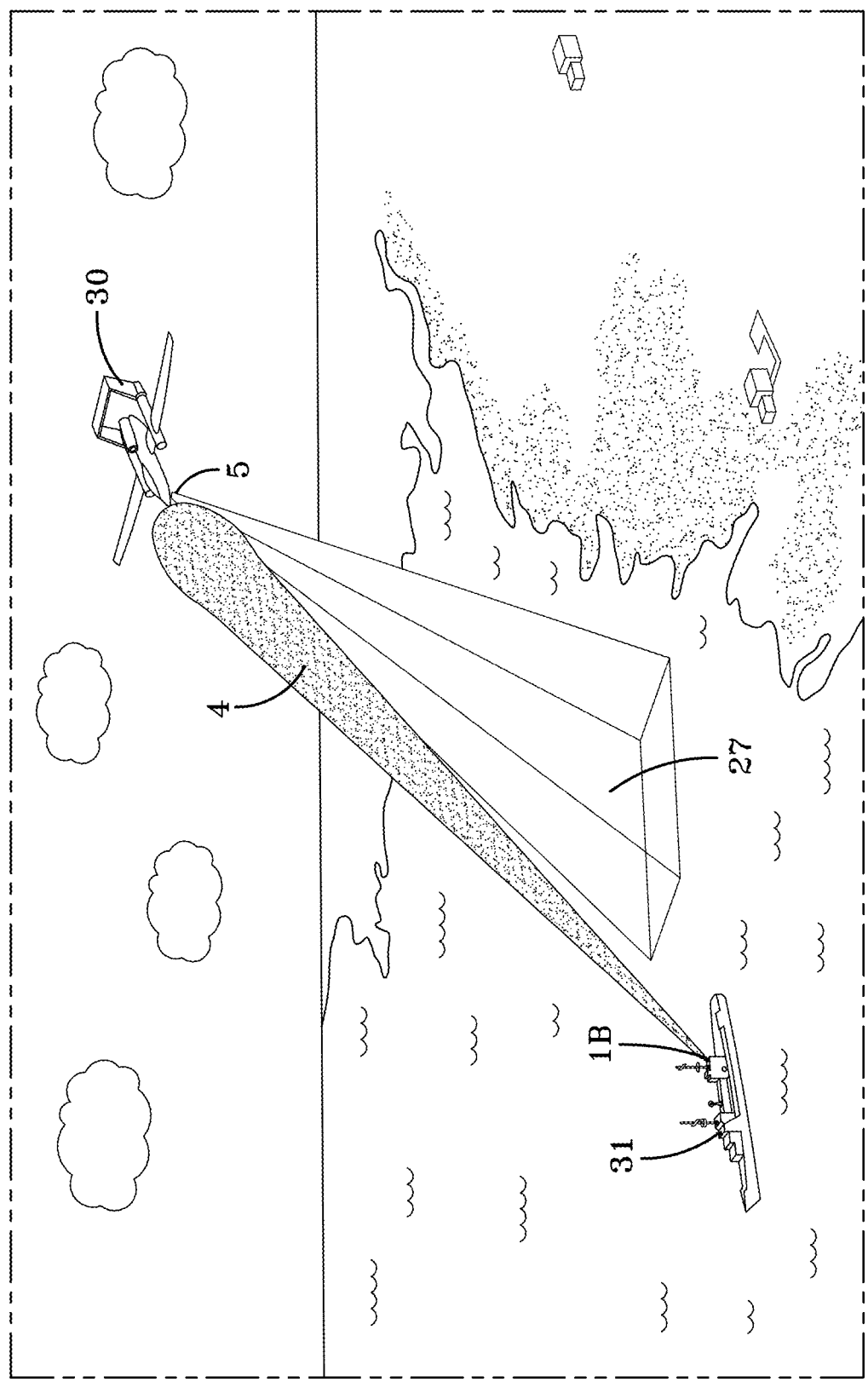
FIG. 3 shows an exemplary embodiment of an operating environment of one or more exemplary ALCSS or SPSS embodiments including a surveillance system including an exemplary artificial intelligence based electro-optic TCAS system and a ship mounted laser oriented on the surveillance system for a purpose of degrading or disrupting the surveillance system.

FIG. 3 shows an exemplary embodiment of an operating environment of one or more exemplary TCAS/ALCSS 1B. An embodiment can include a system such as described in FIG. 1B for a purpose of degrading or disrupting a field of view (FOV) 27 of an EOSOI 5. A ship 31 mounts an exemplary TCAS/ALCSS 1B directing laser output 4 at EOSOI 5 on a UAV 30. The laser output 4 is controlled to degrade or disrupt the EOSOI 5 without destroying it and in some embodiments, for example, operating the laser output 4 to avoid presenting an eye safety danger to aircrew flying in aircraft (not shown) in the vicinity of the UAV 30.

Figure 4:
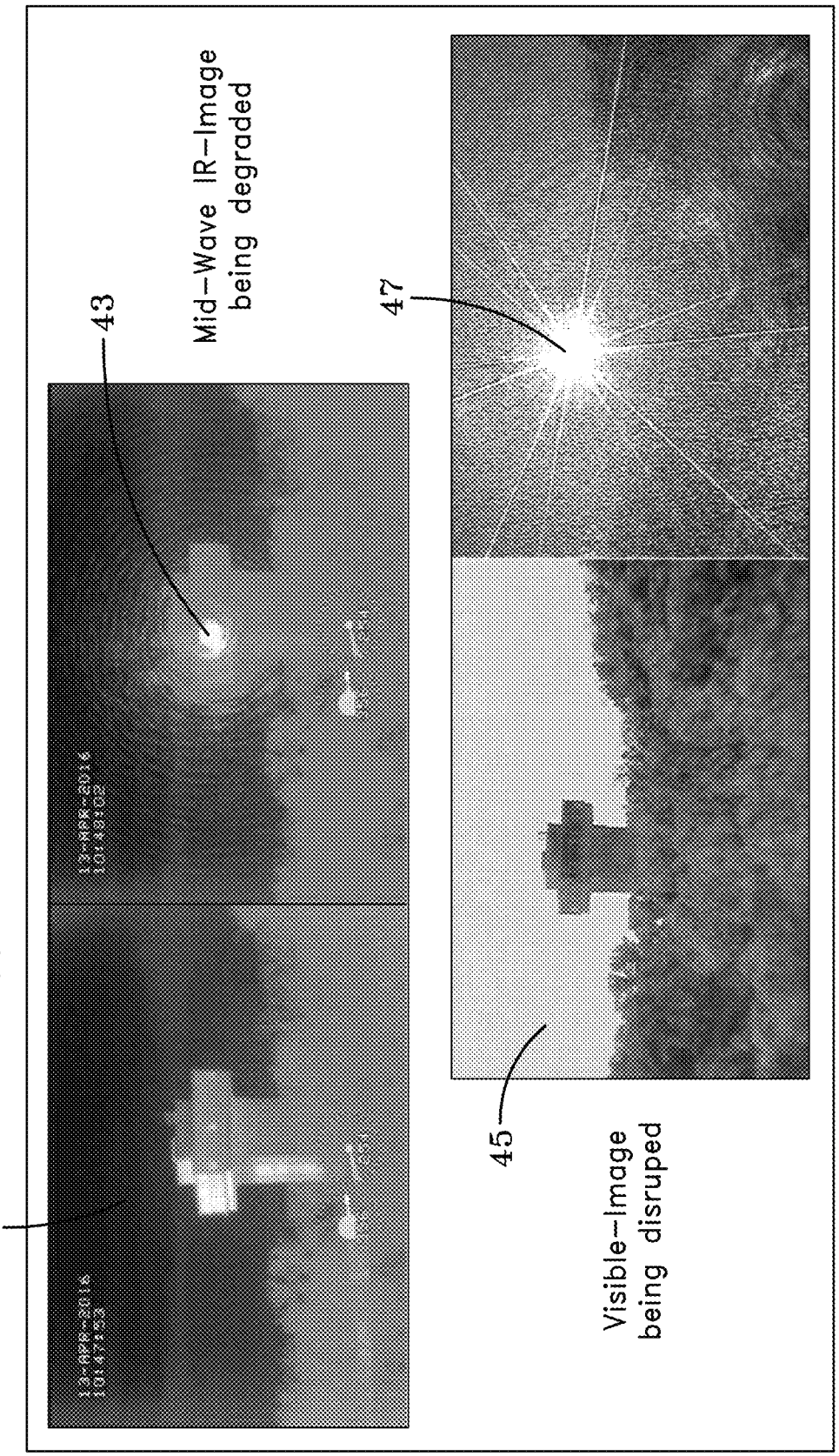
FIG. 4 shows several visual examples of surveillance system degradation or disruption with before and after views used in relation to an exemplary ALCSS or SPSS.

FIG. 4 shows several examples of an exemplary EOSOI 5 degradation or disruption with several before and after views using an exemplary TCAS/ALCSS 1A or 1B. A before LO image 41 displays a tower before a mid-wave infrared (IR) EOSOI 5 is degraded using TCAS/ALCSS 1A or 1B. An after LO image 43 displays a FOV oriented towards the same tower after a mid-wave spectrum EOSOI 5 has been or is oriented towards the tower is degraded using a laser for use in association with an exemplary TCAS/ALCSS 1A or 1B. Another before LO image 45 is shown displaying the tower before a visible spectrum EOSOI 5 is disrupted using a laser used with TCAS/ALCSS 1A or 1B. Another after LO image 47 displays a field of view image of the tower from the visible spectrum EOSOI 5 after the EOSOI 5 is disrupted by the laser. Exemplary definitions of "degradation" can include definitions as defined by or based on Joint Publication 3-13.1, Electronic Warfare, dated 8 Feb. 2012 as reduction of effectiveness or efficiency of an entity of interest or an adversary Electro-Magnetic Spectrum (EMS) dependent system(s). Degradation may confuse or delay actions of an adversary, but a proficient operator may be able to work around the effects. Exemplary definitions of "disruption" can be defined by Joint Publication 3-13.1, Electronic Warfare (EW), dated 8 Feb. 2012 to include or be based on: to interrupt the operation of an adversary or an entity of interest EMS-dependent systems. Exemplary disruption techniques can interfere with an entity of interest or an adversary's use of the EMS to limit the entity's adversary's capabilities. One goal of disruption is to confuse or delay the adversary or entity of interest's action.

Figure 5:
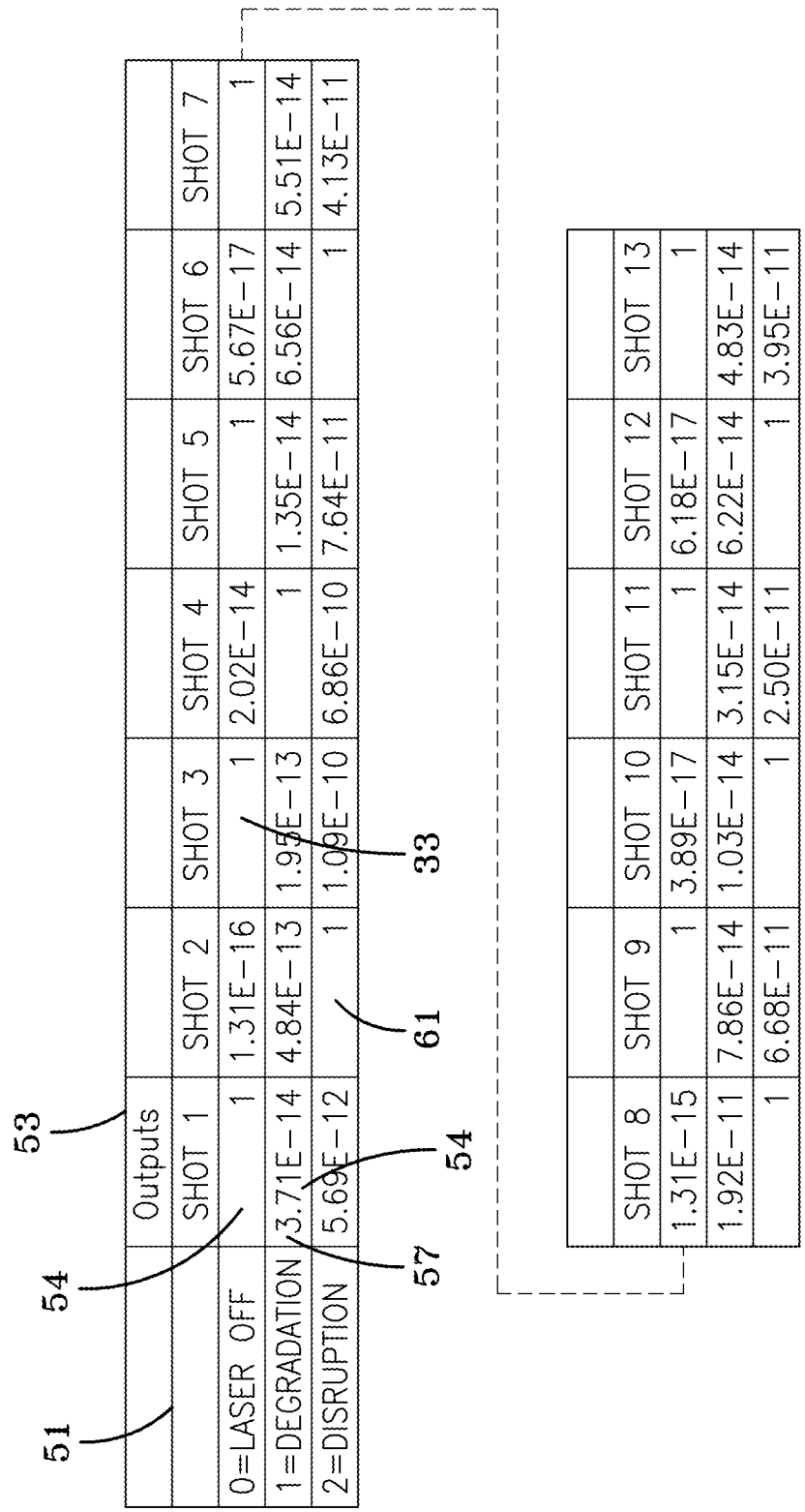
FIG. 5 shows an exemplary scoring output of an exemplary ALCSS TCAS in accordance with one embodiment of the invention.

FIG. 5 shows an exemplary scoring output of an exemplary TCAS/ALCSS system in accordance with two embodiments, 1A or 1B, of the invention. One embodiment 1C of the invention would have an output designating an exemplary wavelength of an exemplary laser 2 or laser output 4 and an appropriate CCM (e.g. filters, iris, or sensor change) to deploy.

Figure 6:
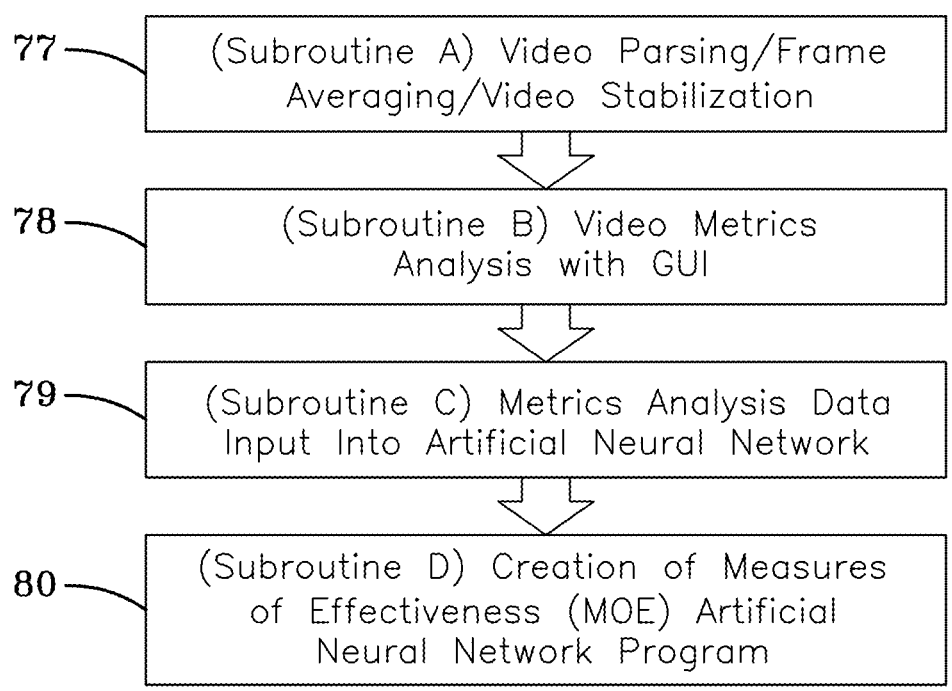
FIG. 6 shows a simplified exemplary overview of a software module architecture of an exemplary ALCSS or SPSS in accordance with an exemplary embodiment of the invention.

FIG. 6 shows an exemplary simplified overview of a software module architecture of an exemplary ALCSS or SPSS in accordance with an exemplary embodiment of the invention. The ALCSS or SPSS commences at step 77 subroutine A video parsing/frame averaging/video stabilization. At step 78 subroutine B video metrics analysis with GUI commences. At step 79 subroutine C metrics analysis data input into artificial neural network commences. At step 80 subroutine D creation of MOE artificial neural network program commences.

Figure 7A:
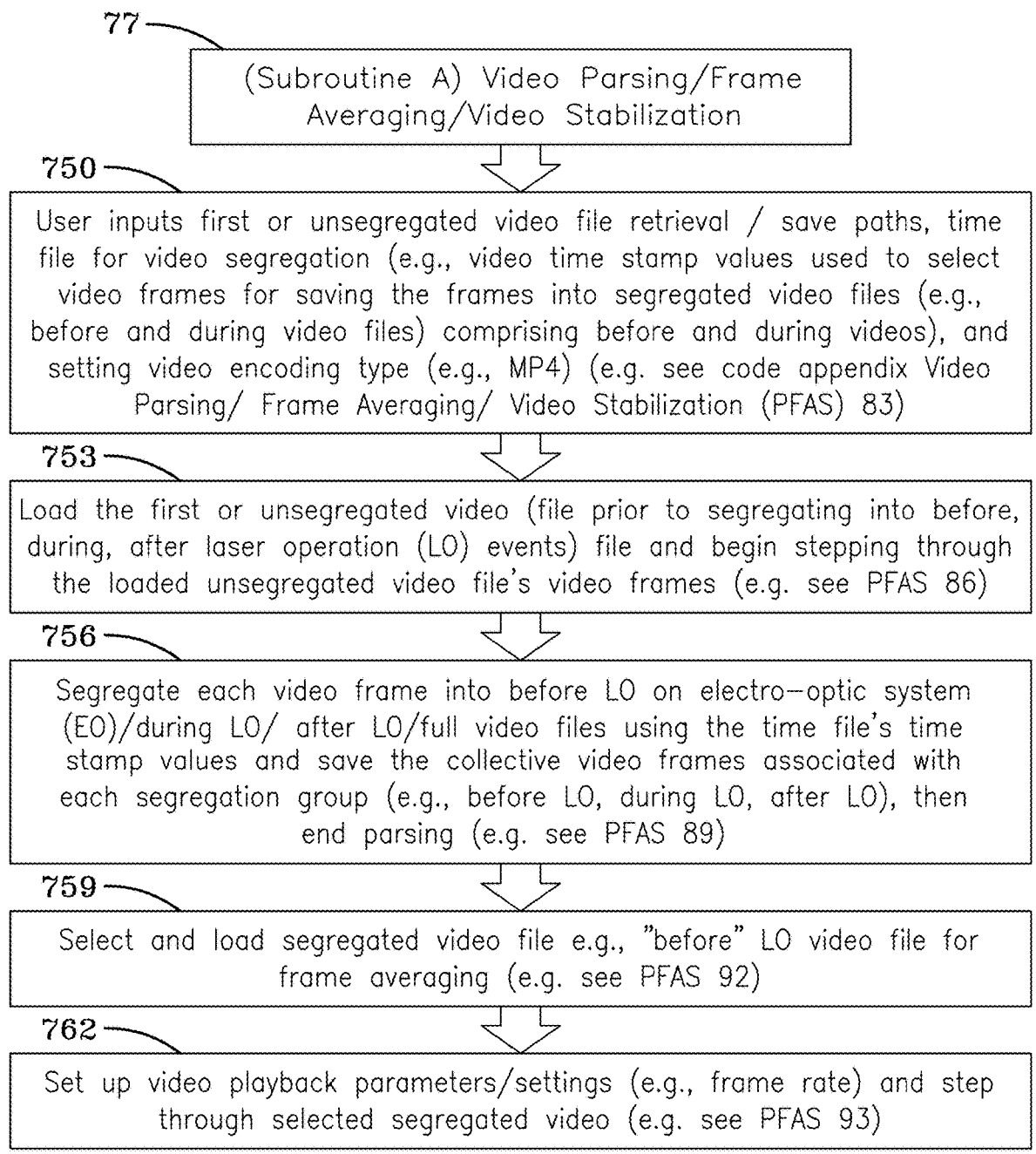

FIGS. 7A and 7B show exemplary machine readable instructions associated with Subroutine A from FIG. 6 in accordance with one embodiment of the invention to perform processing video parsing, frame averaging, and video stabilization. Processing of subroutine A 77 commences at step 750: User inputs first or unsegregated video file retrieval/save paths, time file for video segregation (e.g., video time stamp values used to select video frames for saving the frames into segregated video files (e.g., before and during video files) comprising before and during videos), and setting video encoding type (e.g., MP4) (e.g. see code appendix Video Parsing/Frame Averaging/Video Stabilization (PFAS) 83). At Step 753: Load the first or unsegregated video (file prior to segregating into before, during, after laser operation (LO) events) file and begin stepping through the loaded unsegregated video file's video frames (e.g. see PFAS 86). At Step 756: Segregate each video frame into before LO on electro-optic system (EO)/during LO/after LO/full video files using the time file's time stamp values and save the collective video frames associated with each segregation group (e.g., before LO, during LO, after LO), then end parsing (e.g. see PFAS 89). At Step 759: Select and load segregated video file e.g., "before" LO video file for frame averaging (e.g. see PFAS 92). At Step 762: Set up video playback parameters/settings (e.g., frame rate) and step through selected segregated video (e.g. see PFAS 93). At Step 765: Select a number X (e.g., five) time stamp adjacent segregated, e.g., five before LO video frames immediately before "during LO" time stamp video frames, and averaging adjacent frame pixels within this selected group together and generate an averaged selected before LO video frame file. In this example, perform this adjacent frame averaging for each selected before LO video to get single before LO averaged frame and save averaged before LO video file (e.g. see PFAS 95). At Step 768: User inputs (e.g., selecting a before or during LO video file for video stabilization from video parsing step 89) and video parameters (e.g., select frame region stabilization function searches (e.g., x and y coordinates of search region, width and height in pixel values e.g., 40 by 40 pixels)) within non-avg'd before LO and after LO video files) (e.g. see PFAS 97). At Step 771: Initiate video stabilization (e.g., by use of MATLAB® video stability operator specifying/input of X & Y coordinates for frame search region in GUI or machine instructions/config file and begins stepping through step 97 selected segregated video (e.g. see PFAS 100)). At Step 774: Perform stabilization by reducing frame-to-frame movement through X & Y measurement in video frames. Save new stabilized video. (e.g. see PFAS 103).

Figure 8A:
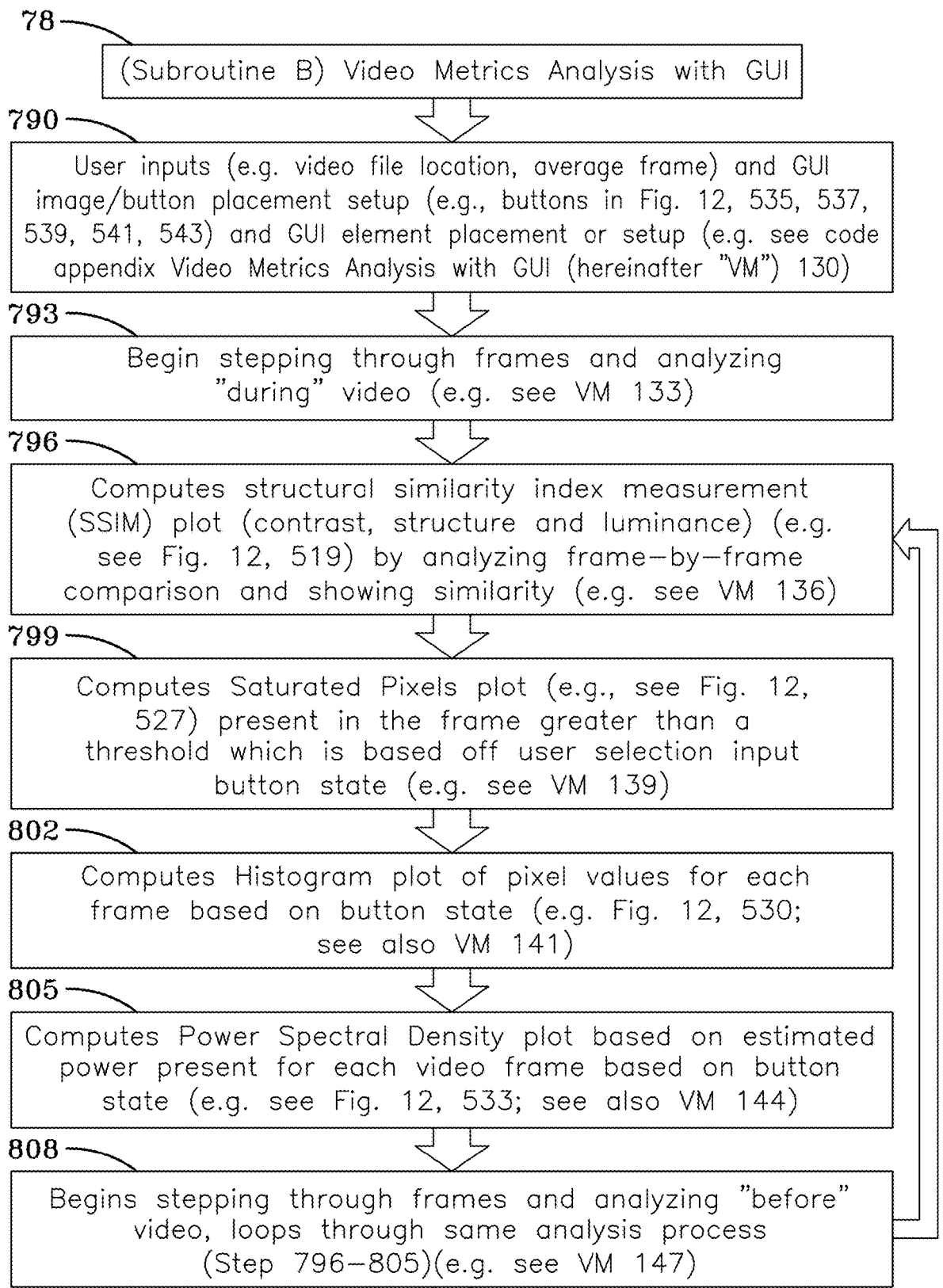
FIG. 8A shows exemplary machine readable instructions associated with Subroutine B from FIG. 6 in accordance with one embodiment of the invention to perform video metrics analysis with an exemplary GUI.

FIG. 8A shows exemplary machine readable instructions associated with Subroutine B 78 from FIG. 6 in accordance with one embodiment of the invention to perform video metrics analysis with an exemplary GUI. At Step 790: User inputs (e.g. video file location, average frame) and GUI image/button placement setup (e.g., buttons in FIG. 12, 535, 537, 539, 541, 543) and GUI element placement or setup (e.g. see code appendix Video Metrics Analysis with GUI (hereinafter "VM") 130). At Step 793: Begin stepping through frames and analyzing "during" video (e.g. see VM 133). At Step 796: Computes structural similarity index measurement (SSIM) plot (contrast, structure, and luminance)(e.g. see FIG. 12, 519) by analyzing frame-by-frame comparison and showing similarity (e.g. see VM 136). At Step 799: Computes Saturated Pixels plot (e.g., see FIG. 12, 527) present in the frame greater than a threshold which is based off user selection input button state (e.g. see VM 139). At Step 802: Computes Power Spectral Density plot based on estimated power present for each video frame based on button state (e.g. see FIG. 12, 533; see also VM 144). At Step 805: Computes Power Spectral Density plot based on estimated power present for each video frame based on button state (e.g. see FIG. 12, 533; see also VM 144). At Step 808: Begins stepping through frames and analyzing "before" video, loops through same analysis process (Step 796-805) (e.g. see VM 147). FIG. 8A is continued in FIG. 8B at Step 811.

FIG. 8B shows a continuation of the machine readable instructions from FIG. 8A. At Step 811: Execute SSIM Data Generating Function: passing neighboring frames through a low pass filter, and analyze similarities between frames (e.g. see VM 156)(e.g., measuring luminance contrast between frames to output a measure of similarity e.g., between zero and one where zero is complete dissimilarity and one is complete similarity which is used as a video metric used in degradation or disruption evaluation). At Step 814: User Selection of a Pixel in Area Where Laser is Expected or Actually Impinges on Video Frames to Generate a Laser Energy Frame Impingement Location Using GUI Pointing Device and Execution of Saturated Pixels Function: Calculates saturation level of selected pixel and uses calculated saturation level of the selected pixel to select all pixels within minus 10 percent and above of selected pixel saturation value, designate the selected pixel as "saturated", then count total number of saturated pixels in each selected frame (e.g. see VM 159) which is used as a video metric used in degradation or disruption evaluation). At Step 817: Execute Radius of Saturated Pixels Function: Calculates centroid of saturated pixels closest to laser energy frame impingement location (selected by user in step 814) and calculates contiguous radius of saturated pixels around this location (e.g. FIG. 12, 524; see VM 161) which is used as a video metric used in degradation or disruption evaluation). At Step 820: Execute Power Spectral Density Function: Calculates a Fast Fourier Transform (spatial to frequency domain) of a video frame of interest (e.g. see VM 165) which is used as a video metric used in degradation or disruption evaluation (e.g., frames of interest are "during" LO frames).

FIG. 9 shows exemplary machine readable instructions associated with subroutine C 80 from FIG. 6 showing an exemplary approach for preparing video metrics analysis data for input into an artificial neural network (ANN). At Step 860: Input learning video metrics (e.g. SSIM/RadOfSatPix/PSD) from Step 836 and Supervised Learning classifications (e.g. no laser, degradation, disruption from Subroutine C Step 836) (e.g. see code appendix Creation of MOE and Artificial Neural Network Program (ANN) 230). At Step 863: Specify number of ANN network layers and number of neurons in each corresponding layer (e.g. see ANN 233). At Step 866: Specify transfer functions for the layers (e.g., logarithmic sigmoid function, tangent sigmoid function, linear transfer function) (e.g. see ANN 236). At Step 869: Choose input and output pre/post-processing error analysis functions (e.g. fixunknowns, mapminmax, mapstd, processpca, removeconstantrows, etc.) (e.g. see ANN 239). At Step 872: Setup video metrics data division for training, validation, and testing (e.g. 70%/15%15%) and video metrics data division method (e.g. randomly) (e.g. see ANN 241). At Step 875: Specify ANN optimization parameters (e.g. number of epochs, min. performance gradient, etc.) and ANN training function (e.g. Levenberg-Marquardt, Bayesian Regulation, etc.) (e.g. see ANN 244). At Step 878: Select a performance function for the ANN algorithm to optimize (e.g. mean squared error, mean absolute error, etc.) (e.g. see ANN 247). At Step 881: Train the ANN on the video metrics data (e.g., structural similarity index measurement, radius and number of saturated pixels, power spectral density, pixel value histogram) and calculate ANN performance (e.g. based on performance function selected in Subroutine D Step 878) during training, validation, and testing (e.g. see ANN 251). At Step 884: Display or view performance plots of the trained network (e.g. confusion matrix, receiver operating characteristic curve) (e.g. see ANN 255) on an output system (e.g. display).

FIG. 11A shows exemplary machine readable instructions associated with subroutine A 77 and B 78 from FIG. 6. In particular, Subroutine A 77 Video Parsing/Frame Averaging/Video Stabilization module is generally implemented by exemplary code appendix module or instruction group 77 that include the following functions: Function sprintf & vision.VideoFileReader 305 is implemented by exemplary code appendix module 83 (See FIGS. 7A and 7B, Step 750). Function fileparts & fopen 308 is implemented by exemplary code appendix module 86 (See Step 753). Functions step, -writeVideo 311 is implemented by exemplary code appendix module 89 (Step 756). Function fileparts 314 is implemented by exemplary code appendix module 92 (Step759) Functions step 317 is executed followed by ~isDone, VideoWriter, step, and imwrite which are implemented by exemplary code appendix module 95 (Step 765).

Functions vision.VideoFilesReader & vision.VideoFilesWriter & vision.GeometricTranslator 323 are implemented by exemplary code appendix module 97 (Step 768). Functions fileInfo.VideoSize, ~isDone, and step 326 are implemented by exemplary code appendix module 100 (Step 771). Function Stabilized & vision.VideoFileWriter 329 are implemented by exemplary code appendix module 103 (Step 774).

FIG. 11A further shows that Subroutine B 78 Video Metrics Analysis with GUI is implemented by code appendix module 78 which includes the following functions: Functions uigetfile & insertButtons & figure & uicontrol & playCallback 332 are implemented by exemplary code appendix module 130 (Step 790). Function vision.VideoFileWriter & step 335 is implemented by exemplary code appendix module 133. Function ssimsource is implemented by exemplary code appendix module 136 (Step 796). Function getSatPixelsGUI 341 is implemented by exemplary code appendix module 139 (Step 799). Function twobarhist 344 is implemented by exemplary code appendix module 141 (Step 802). Function getPowSpecDenGUI 347 is implemented by exemplary code appendix module 144 (Step 802 and 805). Functions vision.VideoFileWriter & step, ssimsource, getSatPixelsGUI, twobarhist, and getPowSpecDenGUI 350 is implemented by code appendix module 147 (Step 808). Function ssimsource 353 is implemented by exemplary code appendix module 156 (Step 811). Function getSatPixelsGUI 356 is implemented by exemplary code appendix module 159 (Step 814) Function satData.minRad 359 is implemented by exemplary code appendix module 161 (Step 817). Function getPowSpecDenGUI 362 is implemented by exemplary code appendix module 165 (Step 820).

FIG. 11B shows an overall functions list associated with exemplary machine readable functions associated with FIG. 6 Subroutines C: Optimization/Selection of Video Metrics (Measures of Effectiveness) For use in Analysis and Data Input Into Artificial Neural Network and Subroutine D: an ANN DEE Type Classifier System that Classifies Images Sequences from EOSOI Outputs Based on Selected MOEs (Selected Video Metrics) (See FIGS. 10A and 10B for Subroutine D process) as well as with FIGS. 9-10B. Subroutine C 79 Artificial Neural Network DEE Type based on Selected MOEs (Selected Video Metrics) Classifier Program (See FIGS. 10A and 10B for Subroutine D process) is implemented by various functions including: xlsread 365 that reads a first set of input files described at FIG. 9, Step 830 (implemented by code appendix module 190)); a second xslread 368 that reads another set of input files described at FIG. 9, Step 833 (implemented by code appendix module 192); cvpartition 371 that is described at FIG. 9, Step 836 and implemented by code appendix module 194; and statset & sequentialfs that is described at FIG. 9, Step 839 and implemented by code appendix module 196.

Figure 10A:
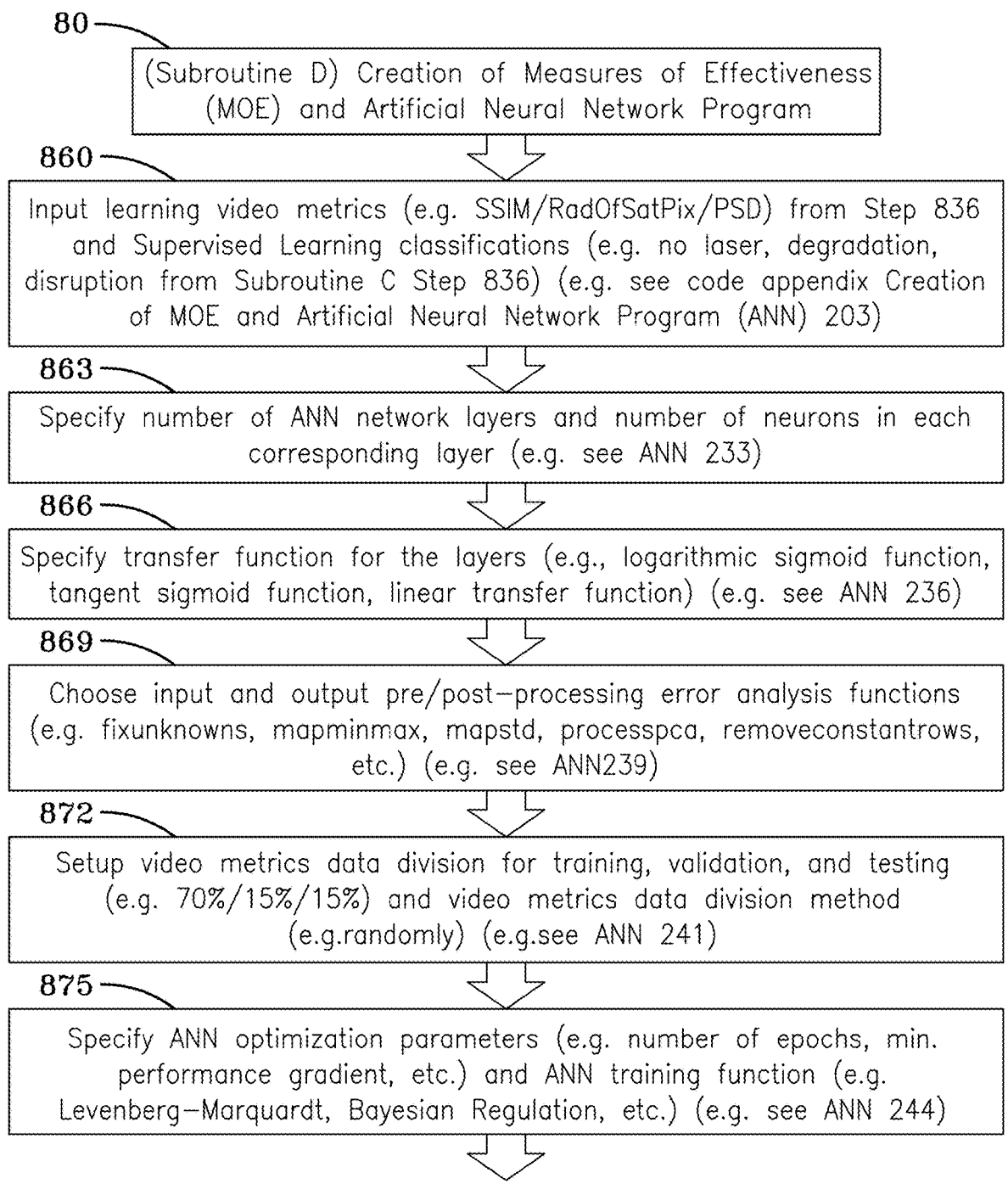
FIGS. 10A and 10B show exemplary machine readable instructions associated with subroutine D from FIG. 6 showing creation of measures of effectiveness and training of the ANN program.
Figure 10B:
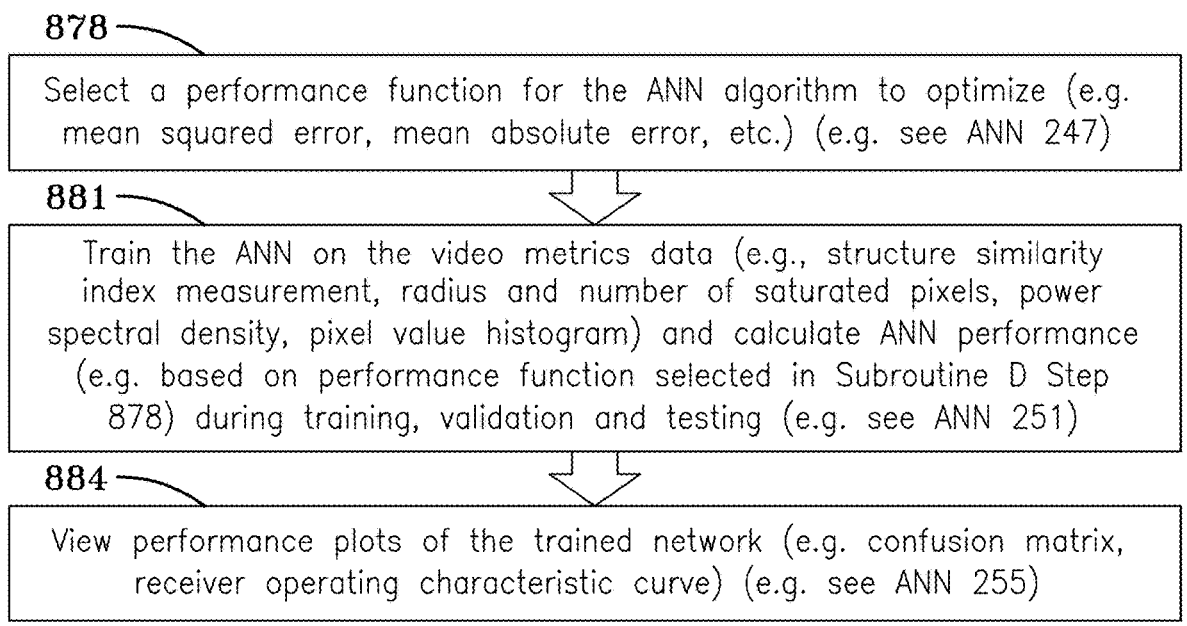

Referring again to FIG. 11B, Subroutine D 80, Creation of MoE Artificial Neural Network Program functions include: File read instruction groups 377 (implemented by code appendix module 230; FIGS. 10A and 10B, Step 860); patternnet 380 (implemented by code appendix module 233; FIGS. 10A and 10B, Step 863); net.layers.transfer.FCN 383 (defines ANN transfer function for each layer (two layers in this embodiment))(implemented by code appendix module 236; FIGS. 10A and 10B, Step 866); net.inputs{1}.processFcns and net.outputs{2}.processFcns 386 (defines ANN input/output processing functions (implemented by code appendix module 239; FIGS. 10A and 10B, Step 869); ANN division of data processing group functions 389 (i.e., net.divideFcn, net.divideMode, net.diviceParam.trainratio, netdivideParam.valRatio, and netdiviceParam.testRatio) (implemented by code appendix module 241; FIGS. 10A and 10B, Step 872); net.trainFcn & net.trainParam. (function and data structure that defines ANN optimization parameters training function and parameters by providing neural network training goals used to train a neural network based on inputs and goals and termination of training processing when goal(s) are met) (implemented by code appendix module 244; FIGS. 10A and 10B, Step 875); net.performFcn 395 (selects a performance function for the ANN algorithm to optimize (e.g. mean squared error, mean absolute error, etc.))(implemented by code appendix module 247; FIGS. 10A and 10B, Step 878); train, test/calculate performance, validate, and recalculate ANN data processing subroutines group 398 (includes train, save net, net, perform, etc)(implemented by code appendix module 251; FIGS. 10A and 10B, Step 881); and plorttrainstate, plotroc, and plotconfusion subroutines group 401 (implemented by code appendix module 255; FIGS. 10A and 10B, Step 884**).

Figure 12:
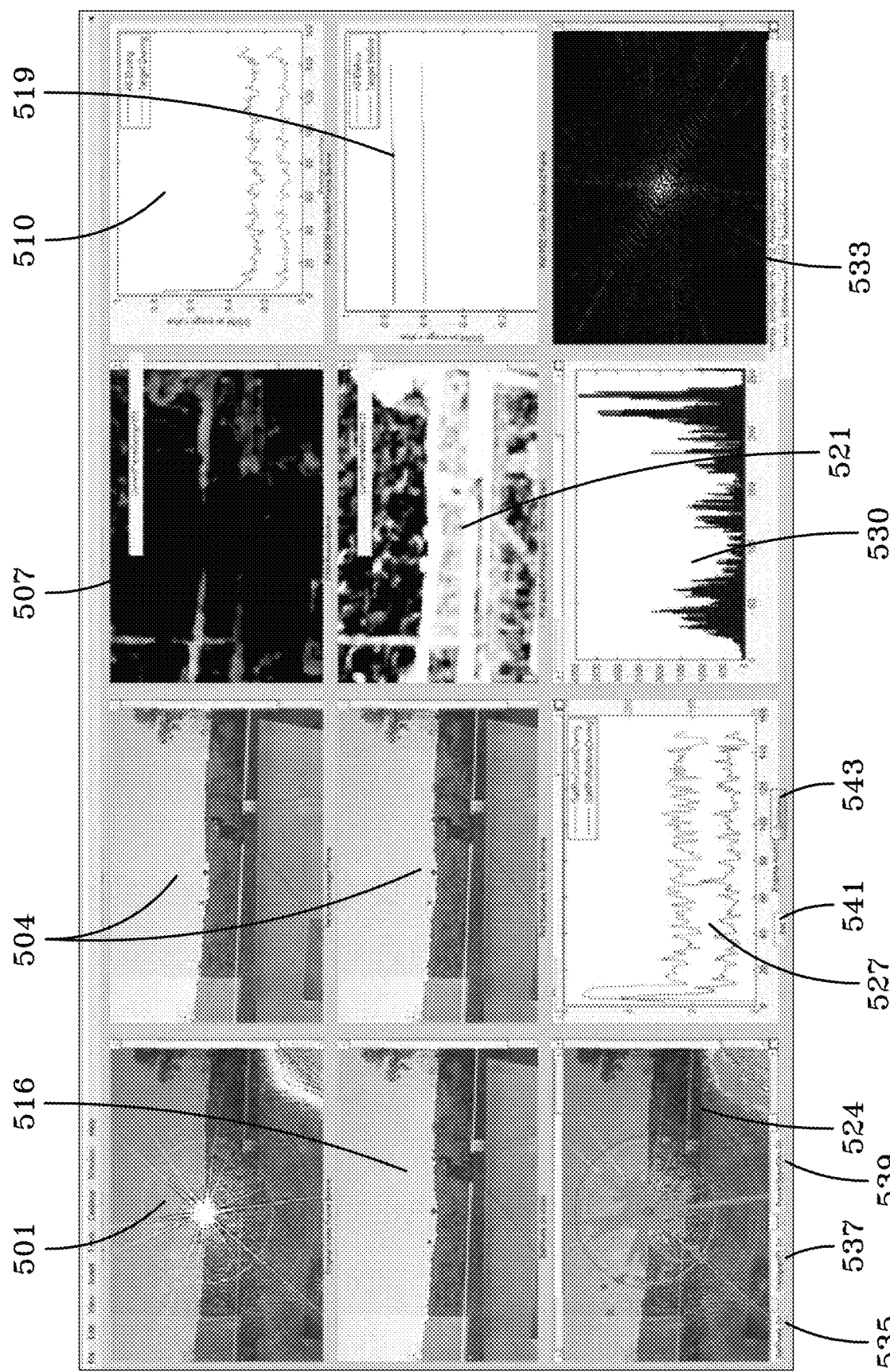
FIG. 12 shows exemplary input GUI elements used with one embodiment of the invention.

FIG. 12 shows exemplary input GUI elements used with one embodiment of the invention. In particular, FIG. 12 shows an image being degraded by a laser 501, a reference image with no laser present 504, a SSIM image comparison 507 showing similarity/dissimilarity between images in 501 and 504, and a numeric representation of SSIM 510 as video progresses (measured in frames). The second row of images in FIG. 12 (starting with image 516) shows an image preceding the frame shown in 501 with no laser present, a SSIM image comparison 521 showing similarity/dissimilarity between images in 516 and 504, and a numeric representation of SSIM 519 as video progress (measured in frames). The third row of images in FIG. 12 total number of saturated pixels via image representation in green 524, number and radius of saturated pixels as video progresses 527, histogram showing spread of pixel values 530 computed by subtracting frame 504 and thirtieth frame into video, and average power spectral density of video 533.

Figure 13:
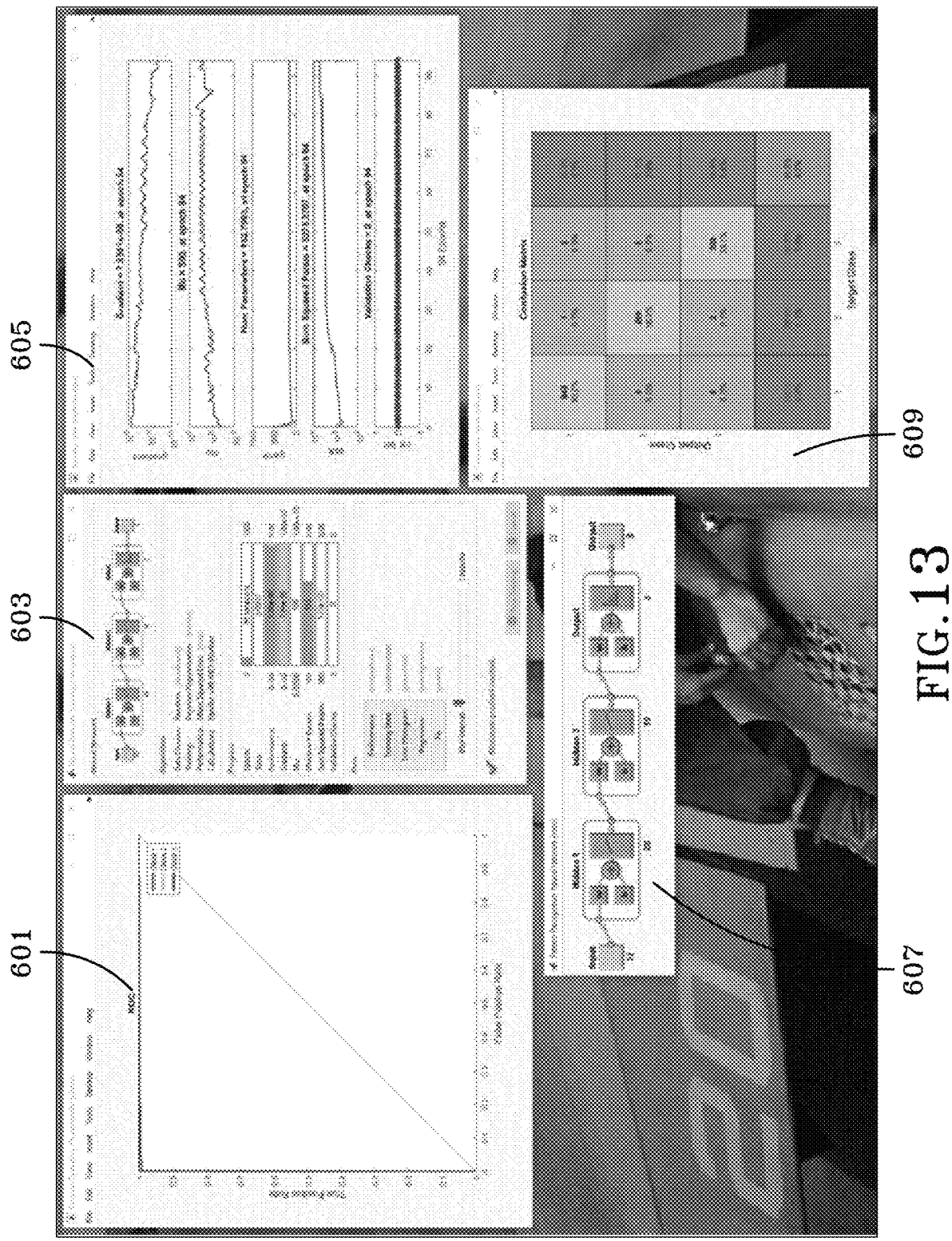
FIG. 13 shows additional exemplary GUI output from an embodiment of the invention.

FIG. 13 shows an additional exemplary GUI output from an embodiment of the invention. In particular, FIG. 13 shows a series of output windows displaying an exemplary receiver operating characteristic (ROC) curve 601. The ROC curve 601 displays results of an exemplary training system (e.g., plotting the true positive classification rate versus the false positive classification rate). FIG. 13 shows a general network diagram and progress screen 603. FIG. 13 also shows performance parameters as the network proceeds through training 605, measured in epochs. FIG. 13 shows the general neural network diagram 607. The general diagram shows, in a specific case, the use of two hidden layers. FIG. 13 also shows a confusion matrix 609, displaying network accuracy. The confusion matrix plots output class on the y-axis, relating to the machine classification and target class on the x-axis, relating to the human classification. Overall network classification is shown in the bottom right corner (blue box).

FIG. 14 shows an exemplary video metric output table associated outputs from subroutine B 78 (FIG. 11A; Code Appendix Module 78) with at least one embodiment of the invention. In this embodiment, the FIG. 14 metric data is what is calculated at a preliminary point before selection of metrics that will actually be used for training the ANN (in other words, the "gross" metrics before suitability for use determination). The FIG. 14 table shows different ways of statistically analyzing collections or groups of image frames associated with time (e.g., mean or average values associated all frames either before or after the DEE for a given metric, max values associated with, before DEE frame groups, and after DEE frame groups associated with starting of a directed energy engagement or DEE where a before DEE frame group segment as well as an after DEE frame group segment can be shown with analysis on entire frames and target is analysis on target sections of selected frames). The term "Target" added on to some of the metrics is a reduced frame representation e.g., 60% of the original frame (imagine a smaller rectangle inside of a larger frame rectangle). The Target representation cuts off the time/date stamp and other unwanted data associated with sections outsides of the target frame representation. In particular embodiment, this table's format comprises a video metric name with a corresponding video metric number adjacent to the metric name (e.g. SSIMDurmax=0.21474, which translates to "Structural Similarity Index Measurement (SSIM) During lasing event, max number over sample set equals 0.21474"). SSIMBefmax is associated with values before a laser is activated (before a DEE). SSIMBefmaxTarget is associated with values FIG. 15 shows another exemplary video metric output table that has been reorganized for input into the ANN. In this example, this table represents a data structure or table including the same data as in FIG. 14 (twenty four data cells). The FIG. 15 data is rearranged in a needed proper order for the ANN with removal of cells with strings.

FIGS. 16A and 16B show an exemplary master video metrics file table with video related measurements associated with laser operation (LO) events concatenated into a single file that is input or used by the ANN. In particular, FIGS. 16A and 16B show vertically concatenates 2, . . . , n LO events into a single files to create the Master Video Metrics File for the ANN.

FIG. 17 shows an exemplary LO event classification file for showing LO event classifications (no laser, degradation, and disruption) and type of laser used for different LO event video sets. In particular, FIG. 17 is the LO event classification file showing 0=no laser, 1=degradation, 2=disruption (shown in column D above) for a specific LO event/shot. Column B is type of laser (e.g. visible, mid-wave IR). Columns E/F/G break column D into a binary representation.

Although the invention has been described in detail with reference to certain preferred embodiments, variations and modifications exist within the spirit and scope of the invention as described and defined in the following claims.

The invention claimed is:

1. A system including a machine learning system used to determine and classify directed energy effects on an electro-optic system of interest (EOSOI) comprising:
a control section comprising a control system and a display coupled with the control system that displays outputs from an EOSOI, the control system comprising a processor, a storage medium for storing machine readable instructions executed by said processor, a data input system, a random access memory (RAM), an input/output system, and first plurality of machine readable instructions stored on said storage medium comprising an Artificial Learning System (ALS);
wherein the ALCSS comprises a first, second, third and fourth module, said ALS system further comprises a supervised learning data file comprising a plurality of image classifications data identifiers comprising a no directed energy event (DEE) identifier associated with a lack of output from a directed energy system incident on said EOSOI, a degradation effect identifier associated with a predetermined degradation effect occurring to the EOSOI during at least one DEE, and a disruption effect to the EOSOI identifier associated with at least one predetermined disruption effect occurring to the EOSOI during at least one said DEE;
wherein said first module comprises a first machine readable instruction set for operating the processor to generate and operate a video parsing, video frame averaging, and video stabilization subroutines to generate a first module outputs comprising a before and during DEE video file parsed sections, the before and during DEE video files respectively comprise a first and second sequence of image files from outputs of said EOSOI respectively captured before and during said DEE;
wherein said second module comprises a second machine readable instruction set that includes a metrics analysis data input and analysis section that receives said first module outputs, generates a graphical user interface (GUI) on said display that displays said first and second sequence of image files from said first module outputs, said module further computes five image metric data using respective ones of a plurality of video metric functions and outputs a second module output comprising image metrics data structure files comprising computed said five image metrics data;
wherein said third module comprises a data input and metrics suitability section that receives said second module outputs and generates a third module output for input into an artificial neural network (ANN) to perform pattern recognition processing comprising image metric relationships evaluations using said ANN, wherein the third module generates a metric suitability scoring value for each of said five video metrics indicative of how well each of said five video metrics is usable for accurately associating one of the image classification data identifiers with said first or second sequence of image files using sequential feature selection processing, wherein the metric suitability scoring value is displayed on a third module GUI shown on said display to enable the user to view each of said first and second sequence of image files and determine if one or more of the five video metrics should be selected or deselected for use in said pattern recognition processing using said ANN, wherein said third module GUI comprises GUI selection elements that further enables the user to deselect one or more of the five video metrics data for said use by said ANN, wherein said third module further extracts and saves second module outputs into a third module output data comprising user selected said one or more of the five video metrics data;
wherein said fourth module comprises an ANN DEE type classifier system that uses the ANN to classify or associate the before and during DEE video file parsed sections based in part on said user selected said one or more of the vide video metrics data in said third module output data and said supervised learning file to produce a fourth module output comprising a trained ANN and a plurality of comparisons comprising a false positive comparison result indicating the trained ANN selected a different image classification data identifier than the user did for a respective one of said sequence of image files and a true positive comparison result indicating the trained ANN selected a same image classification data identifier that the user did for a respective said sequence of image files.

2. A system as in claim 1, wherein said degradation effect identifier is associated with at least one output from the EOSOI that cannot be used for at least one purpose, wherein said disruption identifier is associated with at least one output from the EOSOI that cannot be used for any of a plurality of predetermined purposes associated with identifying features in said at least one output from the EOSOI.

3. A system as in claim 1, wherein said video metrics comprise structural similarity index measurement (SSIM) data, radius of saturated pixels data, number of saturated pixels data, power spectral density data, and pixel value histogram of said EOSOI data on said display.

4. A system as in claim 1, wherein the fourth module receives said third output module outputs and supervised learning file for use in producing a fourth module output comprising a trained ANN system including weights and biases associated with inputs, neurons, and outputs the trained ANN that engages in pattern recognition to classify image features or attributes in later input said before and DEE video file parsed sections output from another EOSOI, the trained ANN system is produced at least in part from an ANN training and classification process comprising said pattern recognition processing comprising image metric relationships evaluations used to associated one of the plurality of image classifications data identifiers with each said before and during DEE video file parsed sections to produce said fourth module output.

5. A system as in claim 1, further comprising a warning section that generates a warning GUI that comprises a DEE event indicator graphic or GUI element that is generated when said ALCSS detects said disruption effect or degradation effect in outputs of said EOSOI.

6. A system as in claim 1, wherein said ALCSS system further comprises a counter-countermeasure section that alters operation of the EOSOI with a predetermined change of operation or settings of the EOSOI when counter-countermeasure section detects at least one of a plurality of EOSOI operations then triggers operation of said fourth module that detect said disruption effect or degradation effect in outputs of said EOSOI.

7. A system as in claim 6, wherein said plurality of EOSOI operations comprises at least one of the following group: changing an auto-gain control response of said EOSOI to lower a gain level of image outputs from said EOSOI to cause a contrast ratio of the EOSOI's outputs to reduce brightness of said EOSOI output, detection of an increase of pixel granularity of said outputs over a region of the EOSOI pixels during said DEE, detection of the DEE causing distortion in one or more said video frames produced by the EOSOI during said DEE, detection of noise increases in one or more said video frames of the first video file over a predetermined threshold during said DEE, detection of decreases of sharpness in one or more said video frames in the first video file during said DEE, or detection of an increase in blur in one or more said video file frames in the first video file recorded during said DEE resulting in a loss of image quality at the EOSOI's maximum sensor recognition range comprising a predetermined image resolution or blur value of the EOSOI.

8. A system as in claim 1, further comprising said EOSOI.

9. A counter surveillance system as in claim 8, further comprising a warning section that generates a warning GUI that comprises a DEE event indicator graphic or GUI element that is generated when said ALCSS detects said disruption effect or degradation effect in outputs of said EOSOI.

10. A counter surveillance system as in claim 8, wherein said ALCSS system further comprises a counter-countermeasure section that alters operation of the EOSOI with a predetermined change of operation or settings of the EOSOI when counter-countermeasure section detects at least one of a plurality of EOSOI operations then triggers operation of said fourth module that detect said disruption effect or degradation effect in outputs of said EOSOI.

11. A system as in claim 1, further comprising said directed energy system.

12. A counter surveillance system including a machine learning system comprising:
an electro-optic (EO) system of interest (EOSOI) comprising an imaging sensor;
a directed energy system adapted to generate one or more directed energy events (DEE) by directing one or more directed energy system outputs into the EOSOI;
a control section comprising a control system and a display coupled with the control system that displays outputs from the EOSOI, the control system comprising a processor, a storage medium for storing machine readable instructions executed by said processor, a data input system, a random access memory (RAM), an input/output system, and first plurality of machine readable instructions stored on said storage medium comprising an Artificial Learning Counter Surveillance System (ALCSS); and
wherein the ALCSS comprises a first, second, third and fourth module, said ALCSS system further comprises a supervised learning data file comprising a plurality of image classifications data identifiers comprising a no directed energy system output incident on said EOSOI identifier, a degradation effect occurring to the EOSOI during at least of said one or more DEEs identifier, and a disruption effect to the EOSOI during at least one of said one or more DEEs identifier, wherein said degradation effect identifier is associated with at least one output from the EOSOI that cannot be used for at least one purpose, wherein said disruption identifier is associated with at least one output from the EOSOI that cannot be used for any of a plurality of predetermined purposes associated with identifying features in said at least one output from the EOSOI;
wherein said first module comprises a first machine readable instruction set for operating the processor to generate and operate a video parsing, video frame averaging, and video stabilization subroutines to generate a first module outputs comprising a before and during DEE video file parsed sections, the before and during DEE video files respectively comprise a first and second sequence of image files from outputs of said EOSOI respectively captured before and during said DEE;
wherein said second module comprises a second machine readable instruction set that includes a metrics analysis data input and analysis section that receives said first module outputs, generates a graphical user interface (GUI) that displays said first and second sequence of image files from said first module outputs on said display, and computes five image metric data using respective ones of a plurality of video metric functions comprising structural similarity index measurement (SSIM) data, radius of saturated pixels data, number of saturated pixels data, power spectral density data, and pixel value histogram of said EOSOI data on said display and outputs a second module output comprising image metrics data structure files comprising computed said five image metrics data;
wherein said third module comprises a data input and metrics suitability section that receives said second module outputs and generates a third module output for input into an artificial neural network (ANN) to perform pattern recognition processing comprising image metric relationships evaluations using said ANN, wherein the third module generates a metric suitability scoring value for each of said five video metrics indicative of how well each of said five video metrics is usable for accurately associating one of the image classification data identifiers with said sequence of image files using sequential feature selection processing, wherein the metric suitability scoring value is displayed on a third module GUI shown on said display to enable the user to view the said sequence of image files and determine if one or more of the five video metrics should be selected or deselected for use in said pattern recognition processing using said ANN, wherein said third module GUI comprises GUI selection elements that further enables the user to deselect one or more of the five video metrics data for said use by said ANN, wherein said third module further extracts and saves second module outputs into a third module output data comprising user selected said one or more of the five video metrics data;

wherein said fourth module comprises an ANN DEE type classifier system that uses the ANN to classify or associate the before and during DEE video file parsed sections based in part on said user selected said one or more of the vide video metrics data in said third module output data and said supervised learning file, the fourth module receives said third output module outputs and supervised learning file for use in producing a fourth module output comprising a trained ANN system including weights and biases associated with inputs, neurons, and outputs the trained ANN that engages in pattern recognition to classify image features or attributes in later input said before and DEE video file parsed sections output from another EOSOI, the trained ANN system is produced at least in part from an ANN training and classification process comprising said pattern recognition processing comprising image metric relationships evaluations used to associated one of the plurality of image classifications data identifiers with each said before and during DEE video file parsed sections to produce said fourth module output.

13. A counter surveillance system as in claim 12, wherein said plurality of EOSOI operations comprises at least one of the following group: changing an auto-gain control response of said EOSOI to lower a gain level of image outputs from said EOSOI to cause a contrast ratio of the EOSOI's outputs to reduce brightness of said EOSOI output, detection of an increase of pixel granularity of said outputs over a region of the EOSOI pixels during said DEE, detection of the DEE causing distortion in one or more said video frames produced by the EOSOI during said DEE, detection of noise increases in one or more said video frames of the first video file over a predetermined threshold during said DEE, detection of decreases of sharpness in one or more said video frames in the first video file during said DEE, or detection of an increase in blur in one or more said video file frames in the first video file recorded during said DEE resulting in a loss of image quality at the EOSOI's maximum sensor recognition range comprising a predetermined image resolution or blur value of the EOSOI.

14. A counter surveillance system including a machine learning system comprising:

an electro-optic (EO) system of interest (EOSOI) comprising an imaging sensor; and a control section comprising a control system and a display coupled with the control system that displays outputs from a directed energy system adapted to generate one or more directed energy events (DEE) by directing one or more directed energy system outputs into the EOSOI, the control system comprising a processor, a storage medium for storing machine readable instructions executed by said processor, a data input system, a random access memory (RAM), an input/output system, and first plurality of machine readable instructions stored on said storage medium comprising an Artificial Learning Counter Surveillance System (ALCSS);

wherein the ALCSS comprises a first, second, third and fourth module, said ALCSS system further comprises a supervised learning data file comprising a plurality of image classifications data identifiers comprising a no directed energy system output incident on said EOSOI identifier, a degradation effect occurring to the EOSOI during at least of said one or more DEEs identifier, and a disruption effect to the EOSOI during at least one of said one or more DEEs identifier;

wherein said first module comprises a first machine readable instruction set for operating the processor to generate and operate a video parsing, video frame averaging, and video stabilization subroutines to generate a first module outputs comprising a before and during DEE video file parsed sections, the before and during DEE video files respectively comprise a first and second sequence of image files from outputs of said EOSOI respectively captured before and during said DEE;

wherein said second module comprises a second machine readable instruction set that includes a metrics analysis data input and analysis section that receives said first module outputs, generates a graphical user interface (GUI) on said display that displays said first and second sequence of image files from said first module outputs, said module further computes five image metric data using respective ones of a plurality of video metric functions and outputs a second module output comprising image metrics data structure files comprising computed said five image metrics data;

wherein said third module comprises a data input and metrics suitability section that receives said second module outputs and generates a third module output for input into an artificial neural network (ANN) to perform pattern recognition processing comprising image metric relationships evaluations using said ANN, wherein the third module generates a metric suitability scoring value for each of said five video metrics indicative of how well each of said five video metrics is usable for accurately associating one of the image classification data identifiers with said sequence of image files using sequential feature selection processing, wherein the metric suitability scoring value is displayed on a third module GUI shown on said display to enable the user to view each of said first and second sequence of image files and determine if one or more of the five video metrics should be selected or deselected for use in said pattern recognition processing using said ANN, wherein said third module GUI comprises GUI selection elements that further enables the user to deselect one or more of the five video metrics data for said use by said ANN, wherein said third module further extracts and saves second module outputs into a third module output data comprising user selected said one or more of the five video metrics data;

wherein said fourth module comprises an ANN DEE type classifier system that uses the ANN to classify or associate the before and during DEE video file parsed sections based in part on said user selected said one or more of the vide video metrics data in said third module output data and said supervised learning file to produce a fourth module output comprising a trained ANN and a plurality of comparisons comprising a false positive comparison result indicating the trained ANN selected a different image classification data identifier than the user did for a respective one of said sequence of image files and a true positive comparison result indicating the trained ANN selected a same image classification data identifier that the user did for a respective said sequence of image files wherein said degradation effect identifier is associated with at least one output from the EOSOI that cannot be used for at least one purpose, wherein said disruption identifier is associated with at least one output from the EOSOI that cannot be used for any of a plurality of predetermined purposes associated with identifying features in said at least one output from the EOSOI;

wherein said video metrics comprise structural similarity index measurement (SSIM) data, radius of saturated pixels data, number of saturated pixels data, power spectral density data, and pixel value histogram of said EOSOI data on said display;

wherein the fourth module receives said third output module outputs and supervised learning file for use in producing a fourth module output comprising a trained ANN system including weights and biases associated with inputs, neurons, and outputs the trained ANN that engages in pattern recognition to classify image features or attributes in later input said before and DEE video file parsed sections output from another EOSOI, the trained ANN system is produced at least in part from an ANN training and classification process comprising said pattern recognition processing comprising image metric relationships evaluations used to associated one of the plurality of image classifications data identifiers with each said before and during DEE video file parsed sections to produce said fourth module output;

wherein the ALCSS system further comprises a warning section that generates a warning GUI that comprises a DEE event indicator graphic or GUI element that is generated when said ALCSS detects said disruption effect or degradation effect in outputs of said EOSOI;

wherein said ALCSS system further comprises a counter-countermeasure section that alters operation of the EOSOI with a predetermined change of operation or settings of the EOSOI when counter-countermeasure section detects at least one of a plurality of EOSOI operations then triggers operation of said fourth module that detect said disruption effect or degradation effect in outputs of said EOSOI;

wherein said plurality of EOSOI operations comprises at least one of the following group: changing an auto-gain control response of said EOSOI to lower a gain level of image outputs from said EOSOI to cause a contrast ratio of the EOSOI's outputs to reduce brightness of said EOSOI output, detection of an increase of pixel granularity of said outputs over a region of the EOSOI pixels during said DEE, detection of the DEE causing distortion in one or more said video frames produced by the EOSOI during said DEE, detection of noise increases in one or more said video frames of the first video file over a predetermined threshold during said DEE, detection of decreases of sharpness in one or more said video frames in the first video file during said DEE, or detection of an increase in blur in one or more said video file frames in the first video file recorded during said DEE resulting in a loss of image quality at the EOSOI's maximum sensor recognition range comprising a predetermined image resolution or blur value of the EOSOI.

15. A method evaluating images using a machine learning system comprising:

operating an electro-optic (EO) system of interest (EOSOI) comprising an imaging sensor; and operating a control section comprising a control system and a display coupled with the control system that displays outputs from a directed energy system adapted to generate one or more directed energy events (DEE) by directing one or more directed energy system outputs into the EOSOI;

providing and inputting a supervised learning data file into the control system, the supervised learning data file comprising a plurality of image classifications data identifiers comprising a no directed energy system output incident on said EOSOI identifier, a degradation effect occurring to the EOSOI during at least of said one or more DEEs identifier, and a disruption effect to the EOSOI during at least one of said one or more DEEs identifier;

operating the a video parsing, video frame averaging, and video stabilization section to generate a first output comprising a before and during DEE video file parsed sections, the before and during DEE video files respectively comprise a first and second sequence of image files from outputs of said EOSOI respectively captured before and during said DEE;

operating a metrics analysis data input and analysis section that receives said first outputs, generates a graphical user interface (GUI) on said display that displays said first and second sequence of image files from said first module outputs, said metrics analysis data input and analysis further computes five image metric data using respective ones of a plurality of video metric functions and outputs a second output comprising image metrics data structure files comprising computed said five image metrics data;

operating a data input and metrics suitability section that receives said second outputs and generates a third output for input into an artificial neural network (ANN) to perform pattern recognition processing comprising image metric relationships evaluations using said ANN, wherein the data input and metrics suitability generates a metric suitability scoring value for each of said five video metrics indicative of how well each of said five video metrics is usable for accurately associating one of the image classification data identifiers with said sequence of image files using sequential feature selection processing, wherein the metric suitability scoring value is displayed on a metrics suitability GUI shown on said display to enable the user to view each of said first and second sequence of image files and determine if one or more of the five video metrics should be selected or deselected for use in said pattern recognition processing using said ANN, wherein said data input and metrics suitability GUI comprises GUI selection elements that further enables the user to deselect one or more of the five video metrics data for said use by said ANN, wherein said data input and metrics suitability section further extracts and saves second module outputs into a third output data comprising user selected said one or more of the five video metrics data; operating an ANN DEE type classifier system that uses the ANN to classify or associate the before and during DEE video file parsed sections based in part on said user selected said one or more of the vide video metrics data in said third module output data and said supervised learning file to produce a fourth output a trained ANN and a plurality of comparisons comprising a false positive comparison result indicating the trained ANN selected a different image classification data identifier than the user did for a respective one of said sequence of image files and a true positive comparison result indicating the trained ANN selected a same image classification data identifier that the user did for a respective said sequence of image files.

16. A method as in claim 15, wherein said degradation effect identifier is associated with at least one output from the EOSOI that cannot be used for at least one purpose, wherein said disruption identifier is associated with at least one output from the EOSOI that cannot be used for any of a plurality of predetermined purposes associated with identifying features in said at least one output from the EOSOI.

17. A method as in claim 15, wherein said video metrics comprise structural similarity index measurement (SSIM) data, radius of saturated pixels data, number of saturated pixels data, power spectral density data, and pixel value histogram of said EOSOI data on said display.

18. A method as in claim 15, wherein the ANN DEE type classifier system receives said third outputs and supervised learning file for use in producing a fourth output comprising said trained ANN system including weights and biases associated with inputs, neurons, and outputs the trained ANN that engages in pattern recognition to classify image features or attributes in later input said before and DEE video file parsed sections output from another EOSOI, the trained ANN system is produced at least in part from an ANN training and classification process comprising said pattern recognition processing comprising image metric relationships evaluations used to associated one of the plurality of image classifications data identifiers with each said before and during DEE video file parsed sections to produce said fourth output.

19. A method as in claim 15, further comprising a operating a warning section that generates a warning GUI that comprises a DEE event indicator graphic or GUI element that is generated when said disruption effect or degradation effect is in outputs of said EOSOI.

20. A method as in claim 15, further comprises operating a counter-countermeasure section that alters operation of the EOSOI with a predetermined change of operation or settings of the EOSOI when counter-countermeasure section detects at least one of a plurality of EOSOI operations then triggers operation of said fourth module that detect said disruption effect or degradation effect in outputs of said EOSOI.

21. A method as in claim 20, wherein said plurality of EOSOI operations comprises at least one of the following group: changing an auto-gain control response of said EOSOI to lower a gain level of image outputs from said EOSOI to cause a contrast ratio of the EOSOI's outputs to reduce brightness of said EOSOI output, detection of an increase of pixel granularity of said outputs over a region of the EOSOI pixels during said DEE, detection of the DEE causing distortion in one or more said video frames produced by the EOSOI during said DEE, detection of noise increases in one or more said video frames of the first video file over a predetermined threshold during said DEE, detection of decreases of sharpness in one or more said video frames in the first video file during said DEE, or detection of an increase in blur in one or more said video file frames in the first video file recorded during said DEE resulting in a loss of image quality at the EOSOI's maximum sensor recognition range comprising a predetermined image resolution or blur value of the EOSOI.

* * * * *